(12) United States Patent
Yoshimine et al.

(10) Patent No.: US 9,711,807 B2
(45) Date of Patent: Jul. 18, 2017

(54) FUEL CELL MODULE WITH HEAT EXCHANGER

(71) Applicant: HONDA MOTOR CO., LTD., Tokyo (JP)

(72) Inventors: Yuki Yoshimine, Wako (JP); Takayuki Aoki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 413 days.

(21) Appl. No.: 14/388,027

(22) PCT Filed: Mar. 18, 2013

(86) PCT No.: PCT/JP2013/058470
§ 371 (c)(1),
(2) Date: Sep. 25, 2014

(87) PCT Pub. No.: WO2013/161469
PCT Pub. Date: Oct. 31, 2013

(65) Prior Publication Data
US 2015/0050573 A1 Feb. 19, 2015

(30) Foreign Application Priority Data

Apr. 24, 2012 (JP) .................. 2012-099202

(51) Int. Cl.
*H01M 8/04014* (2016.01)
*H01M 8/0612* (2016.01)
(Continued)

(52) U.S. Cl.
CPC ...... *H01M 8/04022* (2013.01); *F28D 7/1669* (2013.01); *H01M 8/04074* (2013.01);
(Continued)

(58) Field of Classification Search
CPC .................................. H01M 8/04022
See application file for complete search history.

(56) References Cited

U.S. PATENT DOCUMENTS

| 2001/0009732 A1 | 7/2001 | Schuler | |
| 2005/0067153 A1* | 3/2005 | Wu ......................... F28D 7/16 |
| | | | 165/158 |

(Continued)

FOREIGN PATENT DOCUMENTS

| JP | 03-128280 | 12/1991 |
| JP | 2001-236980 | 8/2001 |

(Continued)

OTHER PUBLICATIONS

Japanese Office Action dated Jul. 14, 2015, with partial English translation, 5 pages.

*Primary Examiner* — Sarah A Slifka
*Assistant Examiner* — Brian Ohara
(74) *Attorney, Agent, or Firm* — Rankin, Hill & Clark LLP

(57) ABSTRACT

A heat exchanger of a fuel cell module includes a plurality of heat exchange pipes connected to an oxygen-containing gas supply chamber at one end, and connected to an oxygen-containing gas discharge chamber at the other end. An end of an oxygen-containing gas inlet pipe for guiding the oxygen-containing gas to the oxygen-containing gas supply chamber is provided in the oxygen-containing gas supply chamber. A plurality of first inlet holes extend through the oxygen-containing gas inlet pipe in an axial direction, and a plurality of second inlet holes extend through the oxygen-containing gas inlet pipe radially. The total area of openings of the first inlet holes is smaller than the total area of openings of the second inlet holes.

8 Claims, 21 Drawing Sheets

(51) Int. Cl.
- *H01M 8/124* (2016.01)
- *F28D 7/16* (2006.01)
- *H01M 8/04007* (2016.01)
- *F28D 21/00* (2006.01)

(52) U.S. Cl.
CPC ... *H01M 8/0618* (2013.01); *F28D 2021/0043* (2013.01); *H01M 2008/1293* (2013.01); *H01M 2300/0074* (2013.01)

(56) References Cited

U.S. PATENT DOCUMENTS

| | | | |
|---|---|---|---|
| 2009/0208800 A1* | 8/2009 | Ogawa | H01M 8/04022 429/411 |
| 2010/0021784 A1 | 1/2010 | Fourmigue | |

FOREIGN PATENT DOCUMENTS

| | | |
|---|---|---|
| JP | 2003-229151 | 8/2003 |
| JP | 2003-327405 | 11/2003 |
| JP | 2004-288434 | 10/2004 |
| JP | 2010-504607 | 2/2010 |

* cited by examiner

FUEL CELL MODULE WITH HEAT EXCHANGER

TECHNICAL FIELD

The present invention relates to a fuel cell module including a fuel cell stack formed by stacking a plurality of fuel cells for generating electricity by electrochemical reactions of a fuel gas and an oxygen-containing gas.

BACKGROUND ART

Typically, a solid oxide fuel cell (SOFC) employs a solid electrolyte of ion-conductive oxide such as stabilized zirconia. The electrolyte is interposed between an anode and a cathode to form an electrolyte electrode assembly (hereinafter also referred to as MEA). The electrolyte electrode assembly is interposed between separators (bipolar plates). In use, generally, predetermined numbers of the electrolyte electrode assemblies and the separators are stacked together to form a fuel cell stack.

As a system including this type of fuel cell stack, for example, a fuel cell battery disclosed in Japanese Laid-Open Patent Publication No. 2001-236980 (hereinafter referred to as conventional technique 1) is known. As shown in FIG. 19, the fuel cell battery includes a fuel cell stack 1a, and a heat insulating sleeve 2a is provided at one end of the fuel cell stack 1a. A reaction device 4a is provided in the heat insulating sleeve 2a. The reaction device 4a includes a heat exchanger 3a.

In the reaction device 4a, as a treatment of liquid fuel, partial oxidation reforming which does not use water is performed. After the liquid fuel is evaporated by an exhaust gas, the liquid fuel passes through a feeding point 5a which is part of the heat exchanger 3a. The fuel contacts an oxygen carrier gas heated by the exhaust gas to induce partial oxidation reforming, and then, the fuel is supplied to the fuel cell stack 1a.

Further, as shown in FIG. 20, a solid oxide fuel cell disclosed in Japanese Laid-Open Patent Publication No. 2010-504607 (PCT) (hereinafter referred to as conventional technique 2) has a heat exchanger 2b including a cell core 1b. The heat exchanger 2b heats the cathode air by utilizing waste heat.

Further, as shown in FIG. 21, a fuel cell system disclosed in Japanese Laid-Open Patent Publication No. 2004-288434 (hereinafter referred to as conventional technique 3) includes a first area is having a columnar shape extending vertically, and an annular second area 2c around the first area 1c, an annular third area 3c around the second area 2c, and an annular fourth area 4c around the third area 3c.

A burner 5c is provided in the first area 1c, and a reforming pipe 6c is provided in the second area 2c. A water evaporator 7c is provided in the third area 3c, and a CO shift converter 8c is provided in the fourth area 4c.

SUMMARY OF INVENTION

In the conventional technique 1, the oxygen carrier gas is supplied from an inlet stub (air inlet) 9a into an annular-gap-shaped sub chamber 6a. After heat exchange between the oxygen carrier gas and the exhaust gas, the oxygen carrier gas is supplied into a common passage 7a. Further, the oxygen carrier gas is supplied to the feeding point 5a through a connection line 8a.

Since the inlet stub 9a for guiding this oxygen carrier gas into the annular-gap-shaped sub chamber 6a is a straight pipe, the flow of the oxygen carrier gas in the annular-gap-shaped sub chamber 6a becomes non-uniform. Therefore, the desired heat exchange performance cannot be achieved. Further, the combustion area tends to be extremely hot, and consequently, degradation occurs.

Further, in the conventional technique 2, the cathode air is guided from an area around the heat exchanger 2b. However, the cathode air does not flow in a circulating manner, and the flow of the cathode air may become non-uniform. Therefore, the desired heat exchange performance cannot be achieved.

Further, in the conventional technique 3, a reforming pipe 9c comprising dual pipes with a closed bottom end is provided, and the reforming pipe 9c is heated by the combustion gas. However, since the single reforming pipe 9c is used, the pressure loss is large.

The present invention has been made to solve the problem of this type, and an object of the present invention is to provide a fuel cell module having simple and compact structure which makes it possible to achieve uniform heat distribution, and improve, e.g., the durability and heat exchange efficiency.

The present invention relates to a fuel cell module including a fuel cell stack formed by stacking a plurality of fuel cells for generating electricity by electrochemical reactions of a fuel gas and an oxygen-containing gas, a reformer for reforming a mixed gas of water vapor and a raw fuel chiefly containing hydrocarbon to produce the fuel gas supplied to the fuel cell stack, an evaporator for evaporating water, and supplying the water vapor to the reformer, a heat exchanger for raising a temperature of the oxygen-containing gas by heat exchange with a combustion gas, and supplying the oxygen-containing gas to the fuel cell stack, an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas, and a start-up combustor for combusting the raw fuel and the oxygen-containing gas to produce the combustion gas.

In the fuel cell module, the heat exchanger includes an annular oxygen-containing gas supply chamber to which the oxygen-containing gas is supplied, an annular oxygen-containing gas discharge chamber to which the heated oxygen-containing gas is discharged, heat exchange pipes connected to the oxygen-containing gas supply chamber at one end, and connected to the oxygen-containing gas discharge chamber at another end, and a combustion gas channel for supplying the combustion gas to a space between the heat exchange pipes.

Further, an end of an oxygen-containing gas inlet pipe for guiding the oxygen-containing gas to the oxygen-containing gas chamber is provided in the oxygen-containing gas supply chamber. A plurality of first inlet holes extend through an axial end surface of the oxygen-containing gas inlet pipe in an axial direction, and a plurality of second inlet holes extend through a circumferential end surface of the oxygen-containing gas inlet pipe radially. The total area of openings of the first inlet holes is smaller than the total area of openings of the second inlet holes.

In the present invention, in the heat exchanger, the annular oxygen-containing gas supply chamber, the annular oxygen-containing gas discharge chamber, and the heat exchange pipes are provided as basic structure. Thus, simple structure is achieved easily. Accordingly, the production cost of the heat exchanger is reduced effectively. Further, by changing the volumes of the oxygen-containing gas supply chamber and the oxygen-containing gas discharge chamber, the length, the diameter, and the number of the pipes, the desired operation can be achieved on various operating conditions, and a wider variety of designs become available.

Further, the first inlet holes extend through the axial end surface of the oxygen-containing gas inlet pipe in the axial direction, and the second inlet holes extend through the circumferential end surface of the oxygen-containing gas inlet pipe radially. The total area of openings of the first inlet holes is smaller than the total area of openings of the second inlet holes. In the structure, it becomes possible to distribute the oxygen-containing gas to each of the heat exchange pipes uniformly, the temperature distribution in the fuel cell module becomes uniform, and improvement in the durability and heat exchange efficiency is achieved.

DESCRIPTION OF EMBODIMENTS

Figure 1:
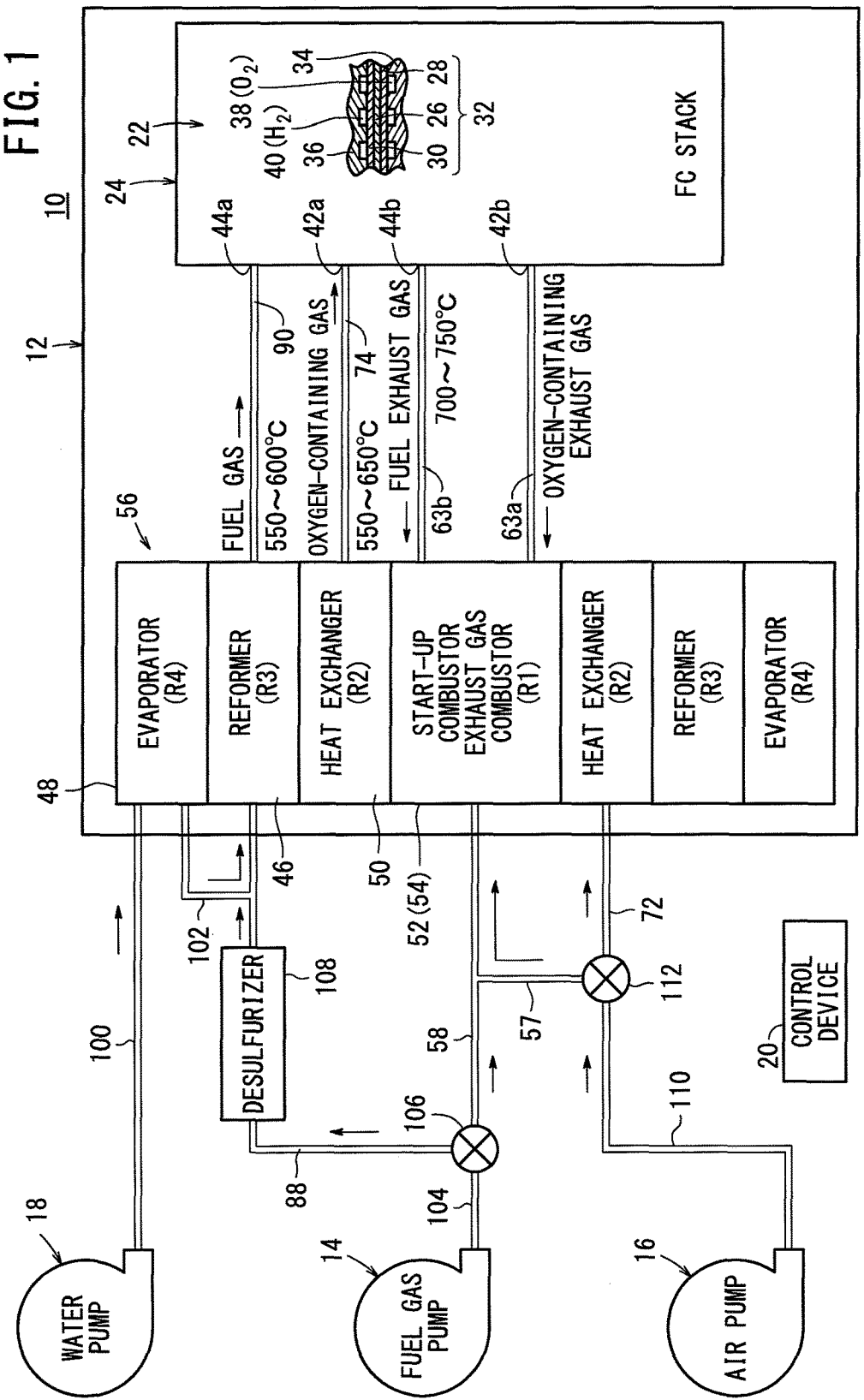
FIG. 1 is a diagram schematically showing structure of a fuel cell system including a fuel cell module according to a first embodiment of the present invention.

As shown in FIG. 1, a fuel cell system 10 includes a fuel cell module 12 according to a first embodiment of the present invention, and the fuel cell system 10 is used in various applications, including stationary and mobile applications. For example, the fuel cell system 10 is mounted on a vehicle.

The fuel cell system 10 includes the fuel cell module (SOFC module) 12 for generating electrical energy in power generation by electrochemical reactions of a fuel gas (a gas produced by mixing a hydrogen gas, methane, and carbon monoxide) and an oxygen-containing gas (air), a raw fuel supply apparatus (including a fuel gas pump) 14 for supplying a raw fuel (e.g., city gas) to the fuel cell module 12, an oxygen-containing gas supply apparatus (including an air pump) 16 for supplying the oxygen-containing gas to the fuel cell module 12, a water supply apparatus (including a water pump) 18 for supplying water to the fuel cell module 12, and a control device 20 for controlling the amount of electrical energy generated in the fuel cell module 12.

The fuel cell module 12 includes a fuel cell stack 24 formed by stacking a plurality of solid oxide fuel cells 22 in a vertical direction (or horizontal direction). The fuel cell 22 includes an electrolyte electrode assembly (MEA) 32. The electrolyte electrode assembly 32 includes a cathode 28, an anode 30, and an electrolyte 26 interposed between the cathode 28 and the anode 30. For example, the electrolyte 26 is made of ion-conductive oxide such as stabilized zirconia.

A cathode side separator 34 and an anode side separator 36 are provided on both sides of the electrolyte electrode assembly 32. An oxygen-containing gas flow field 38 for supplying the oxygen-containing gas to the cathode 28 is formed in the cathode side separator 34, and a fuel gas flow field 40 for supplying the fuel gas to the anode 30 is formed in the anode side separator 36. As the fuel cell 22, various types of conventional SOFCs can be adopted.

The operating temperature of the fuel cell 22 is high, at several hundred ° C. Methane in the fuel gas is reformed at the anode 30 to obtain hydrogen and CO, and the hydrogen and CO are supplied to a portion of the electrolyte 26 adjacent to the anode 30.

An oxygen-containing gas supply passage 42a, an oxygen-containing gas discharge passage 42b, a fuel gas supply passage 44a, and a fuel gas discharge passage 44b extend through the fuel cell stack 24. The oxygen-containing gas supply passage 42a is connected to an inlet of each oxygen-containing gas flow field 38, the oxygen-containing gas discharge passage 42b is connected to an outlet of each oxygen-containing gas flow field 38, the fuel gas supply passage 44a is connected to an inlet of each fuel gas flow field 40, and the fuel gas discharge passage 44b is connected to an outlet of each fuel gas flow field 40.

The fuel cell module 12 includes a reformer 46 for reforming a mixed gas of water vapor and a raw fuel chiefly containing hydrocarbon (e.g., city gas) to produce a fuel gas supplied to the fuel cell stack 24, an evaporator 48 for evaporating water and supplying the water vapor to the reformer 46, a heat exchanger 50 for raising the temperature of the oxygen-containing gas by heat exchange with a combustion gas, and supplying the oxygen-containing gas to the fuel cell stack 24, an exhaust gas combustor 52 for combusting the fuel gas discharged from the fuel cell stack 24 as a fuel exhaust gas and the oxygen-containing gas discharged from the fuel cell stack 24 as an oxygen-containing exhaust gas to produce the combustion gas, and a start-up combustor 54 for combusting the raw fuel and the oxygen-containing gas to produce the combustion gas.

Basically, the fuel cell module 12 is made up of the fuel cell stack 24 and FC (fuel cell) peripheral equipment 56. The FC peripheral equipment 56 includes the reformer 46, the evaporator 48, the heat exchanger 50, the exhaust gas combustor 52, and the start-up combustor 54.

Figure 2:
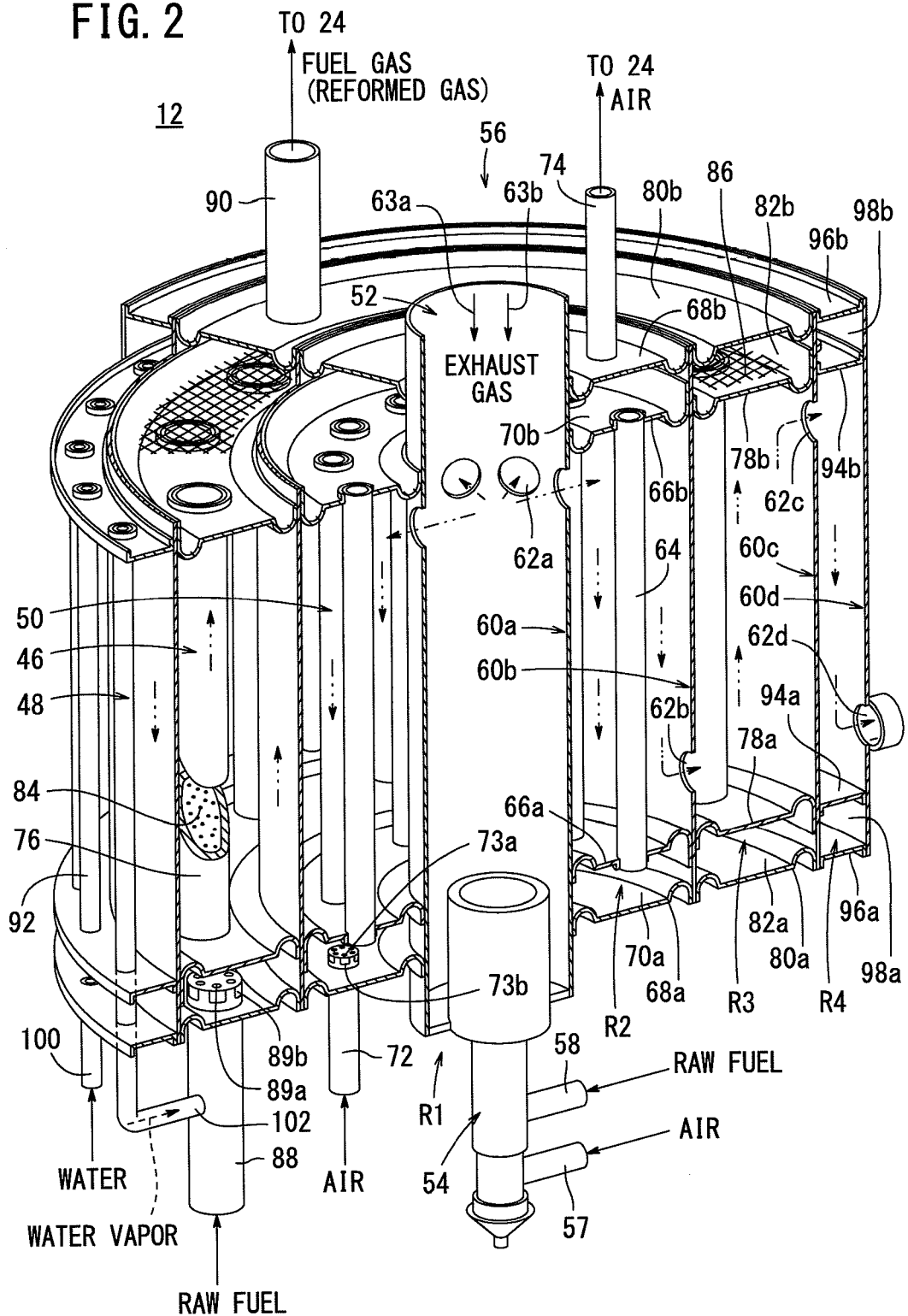
FIG. 2 is a perspective view with partial omission showing FC peripheral equipment of the fuel cell module.

As shown in FIG. 2, the FC peripheral equipment 56 includes a first area R1 comprising, e.g., a circular opening where the exhaust gas combustor 52 and the start-up combustor 54 are provided, an annular second area R2 formed around the first area R1 where the heat exchanger 50 is provided, an annular third area R3 formed around the second area R2 where the reformer 46 is provided, and an annular fourth area R4 formed around the third area R3 where the evaporator 48 is provided.

Figure 3:
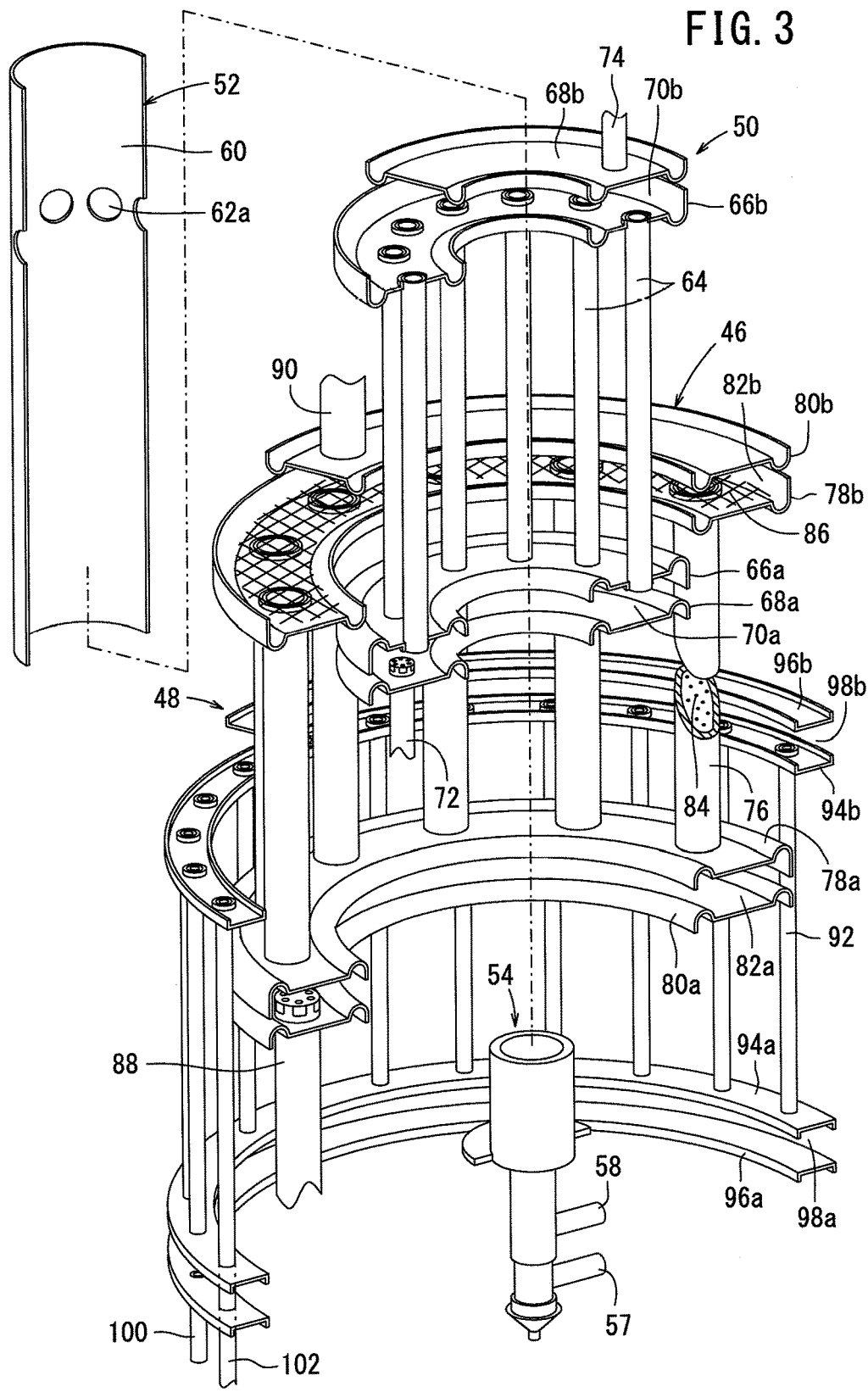
FIG. 3 is an exploded perspective view showing main components of the FC peripheral equipment.

As shown in FIGS. 2 and 3, the start-up combustor 54 includes an air supply pipe 57 and a raw fuel supply pipe 58. The start-up combustor 54 has an ejector function, and generates negative pressure in the raw fuel supply pipe 58 by the flow of the air supplied from the air supply pipe 57 for sucking the raw fuel.

Figure 4:
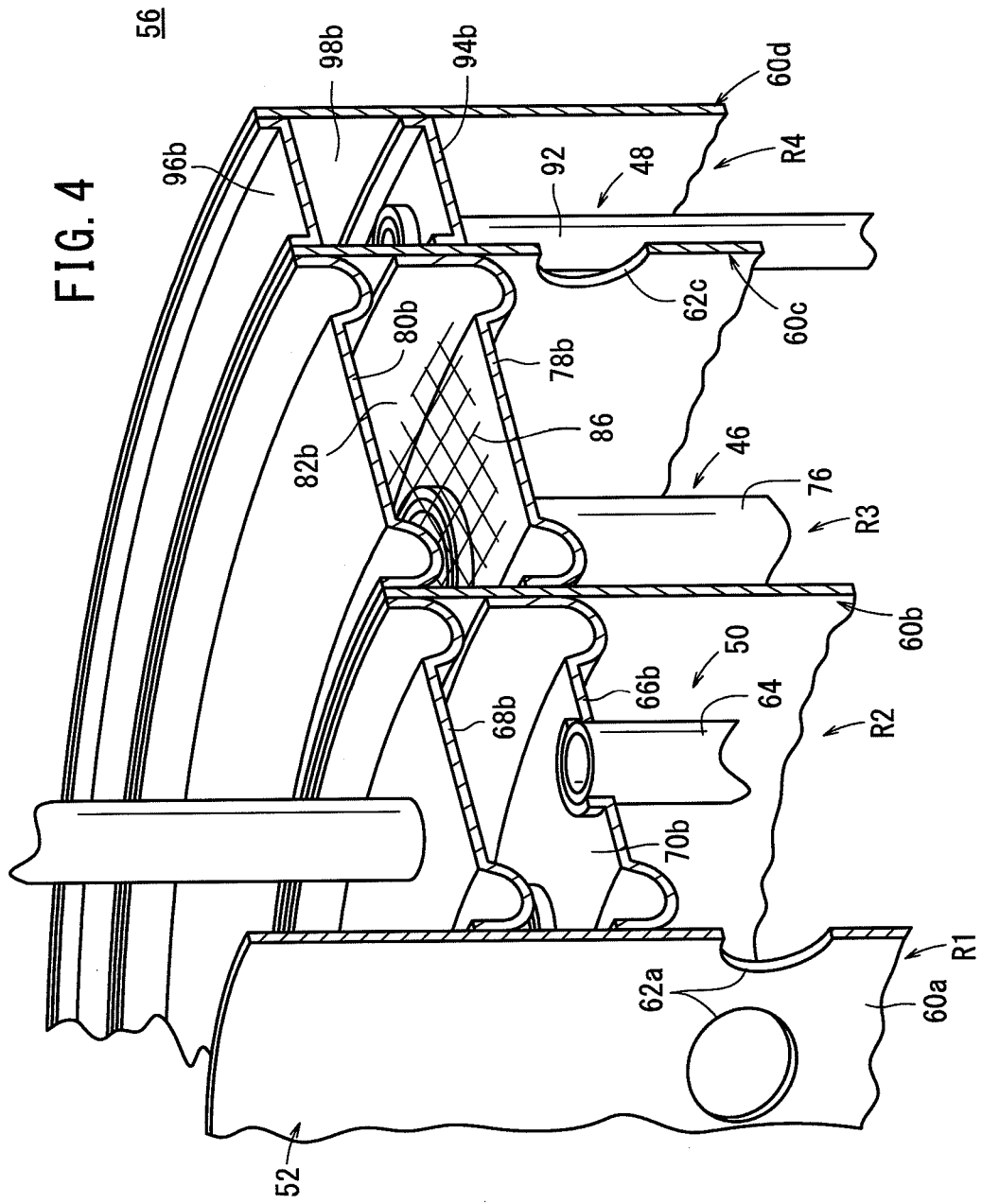
FIG. 4 is an enlarged perspective view showing main components of the FC peripheral equipment.

As shown in FIGS. 2 and 4, the FC peripheral equipment 56 includes a first partition plate 60a provided between the first area R1 and the second area R2, a second partition plate 60b provided between the second area R2 and the third area R3, and a third partition plate 60c provided between the third area R3 and the fourth area R4. A fourth partition plate 60d is provided around the fourth area R4.

As shown in FIGS. 2 and 3, the exhaust gas combustor 52 is provided inside the first partition plate 60a containing the start-up combustor 54. The first partition plate 60a has a cylindrical shape, and a plurality of first combustion gas holes 62a are formed along the outer circumferential portion of the first partition plate 60a, adjacent to an end of the first partition plate 60a closer to the fuel cell stack 24.

A plurality of second combustion gas holes 62b are formed adjacent to an end of the second partition plate 60b opposite to the fuel cell stack 24. A plurality of third combustion gas holes 62c are formed adjacent to an end of the third partition plate 60c closer to the fuel cell stack 24. A plurality of fourth combustion gas holes 62d are formed adjacent to an end of the fourth partition plate 60d opposite to the fuel cell stack 24. The combustion gas is discharged to the outside through the fourth combustion gas holes 62d.

One end of an oxygen containing exhaust gas channel 63a and one end of an fuel exhaust gas channel 63b are provided at the first partition plate 60a. The combustion gas is produced inside the first partition plate 60a by combustion reaction of the fuel gas (specifically, fuel exhaust gas) and the oxygen-containing gas (specifically, oxygen-containing exhaust gas).

As shown in FIG. 1, the other end of the oxygen-containing exhaust gas channel 63a is connected to the oxygen-containing gas discharge passage 42b of the fuel cell stack 24, and the other end of the fuel exhaust gas channel 63b is connected to the fuel gas discharge passage 44b of the fuel cell stack 24.

As shown in FIGS. 2 and 3, the heat exchanger 50 includes a plurality of heat exchange pipes (heat transmission pipes) 64 provided around the first partition plate 60a. The heat exchange pipes 64 are fixed to a first inner ring 66a at one end (the end opposite to the fuel cell stack 24: hereinafter, in the same manner, the end opposite to the fuel cell stack 24 is referred to as one end), and the heat exchange pipes 64 are fixed to a first inner ring 66b at the other end (the end closer to the fuel cell stack 24: hereinafter, in the same manner, the end closer to the fuel cell stack 24 is referred to as the other end).

A first outer ring 68a is provided outside the first inner ring 66a, and a first outer ring 68b is provided outside the first inner ring 66b. The first inner rings 66a, 66b and the first outer rings 68a, 68b are fixed to the outer circumferential surface of the first partition plate 60a and the inner circumference surface of the second partition plate 60b.

An annular oxygen-containing gas supply chamber 70a is formed between the first inner ring 66a and the first outer ring 68a, and the oxygen-containing gas is supplied to the oxygen-containing gas supply chamber 70a. An annular oxygen-containing gas discharge chamber 70b is formed between the first inner ring 66b and the first outer ring 68b, and the heated oxygen-containing gas is discharged to the oxygen-containing gas discharge chamber 70b (see FIGS. 2 to 4). Both ends of each of the heat exchange pipes 64 are opened to the oxygen-containing gas supply chamber 70a and the oxygen-containing gas discharge chamber 70b.

Figure 5:
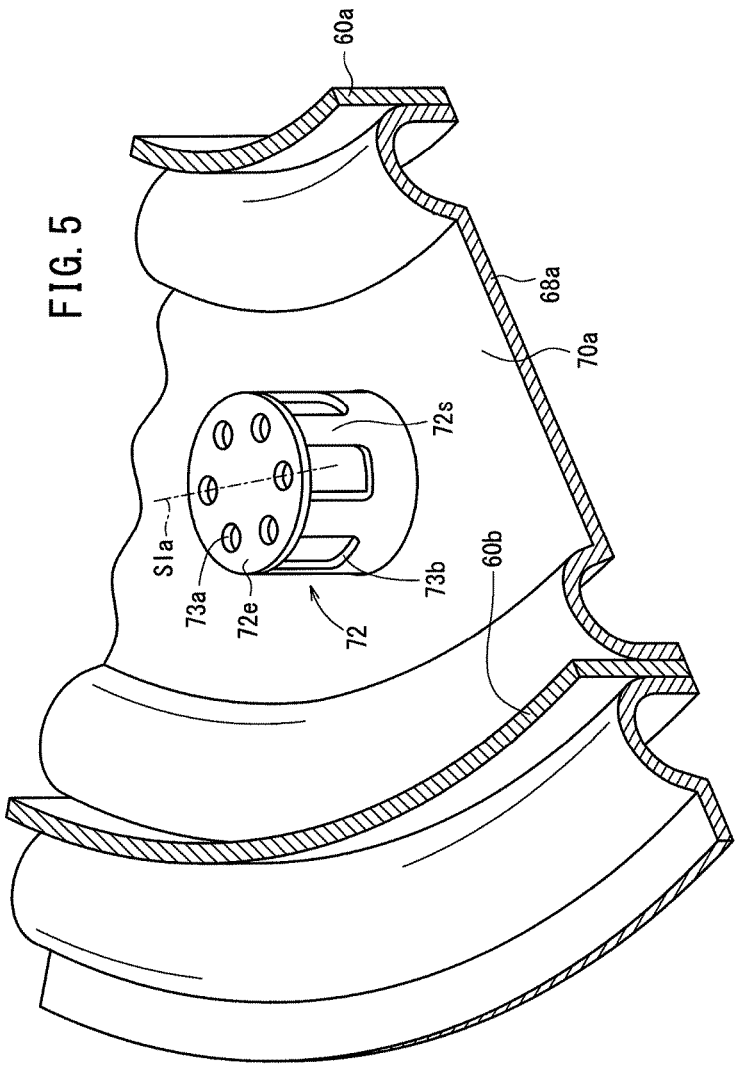
FIG. 5 is a perspective view showing an end of an oxygen-containing gas inlet pipe of the FC peripheral equipment.
Figure 6:
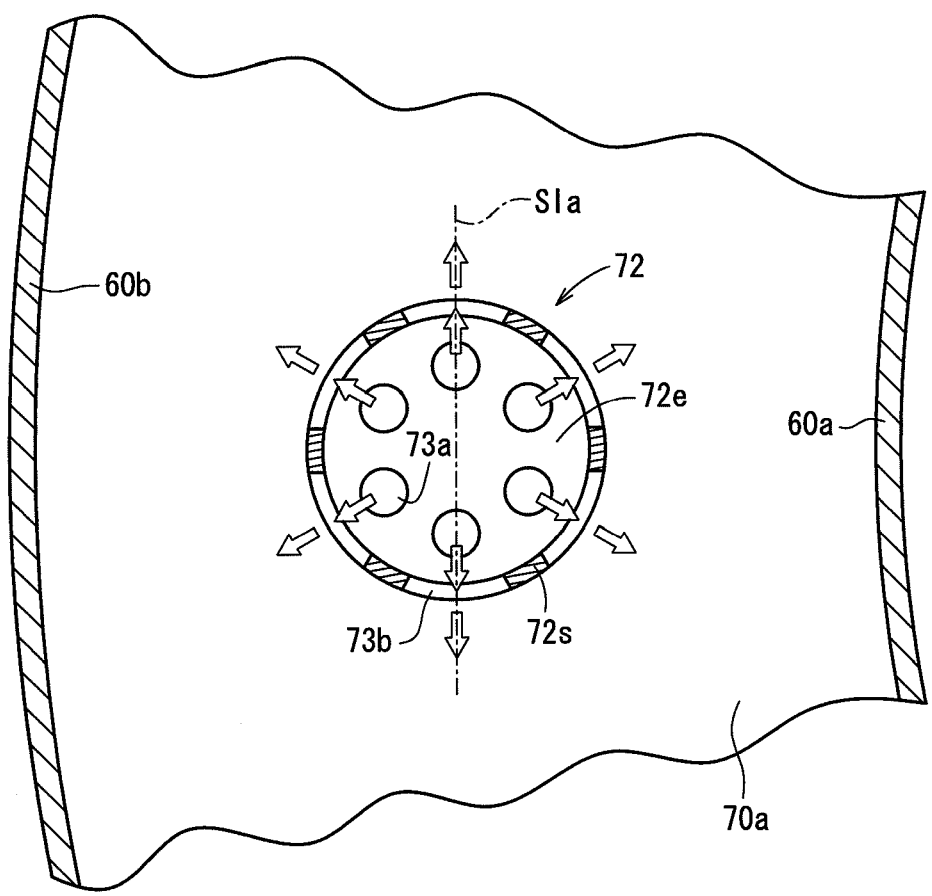
FIG. 6 is a plan view showing the end of the oxygen-containing gas inlet pipe.

An end of an oxygen-containing gas inlet pipe 72 is provided in the oxygen-containing gas supply chamber 70a as an annular space. As shown in FIGS. 5 and 6, a plurality of first inlet holes 73a extend through an axial end surface 72e of the oxygen-containing gas inlet pipe 72 in an axial direction. A plurality of second inlet holes 73b extend through a circumferential end surface 72s of the oxygen-containing gas inlet pipe 72 radially.

The axial end surface 72e has a flat circular disk shape, and a plurality of, e.g., six first inlet holes 73a are formed along a circle around the center of the circular disk, at equal intervals of angle. A plurality of, e.g., six second inlet holes 73b are formed in the circumferential end surface 72s at equal intervals of angle. Each of the first inlet holes 73a has a circular opening, and each of the second inlet holes 73b has a rectangular (quadrilateral) opening. The total area of openings of the first inlet holes 73a is smaller than the total area of openings of the second inlet holes 73b.

Two of the second inlet holes 73b of the oxygen-containing gas inlet pipe 72 that are positioned radially opposite to each other are arranged in parallel to a tangential direction S1a of the oxygen-containing gas supply chamber 70a as reference inlet holes, and the other second inlet holes 73b are spaced at equal intervals of angle from the reference inlet holes.

In the case where the diameter of the oxygen-containing gas inlet pipe 72 is large, the tangential direction S1a is in parallel to the tangential direction at the point where the outer circumference of the oxygen-containing gas inlet pipe 72 contacts the outer circumference of the first partition plate 60a and/or at the point where the outer circumference of the oxygen-containing gas inlet pipe 72 contacts the inner circumference of the second partition plate 60b. The first inlet holes 73a are arranged on a connection line connecting the second inlet holes 73b that are positioned opposite to each other.

Figure 7:
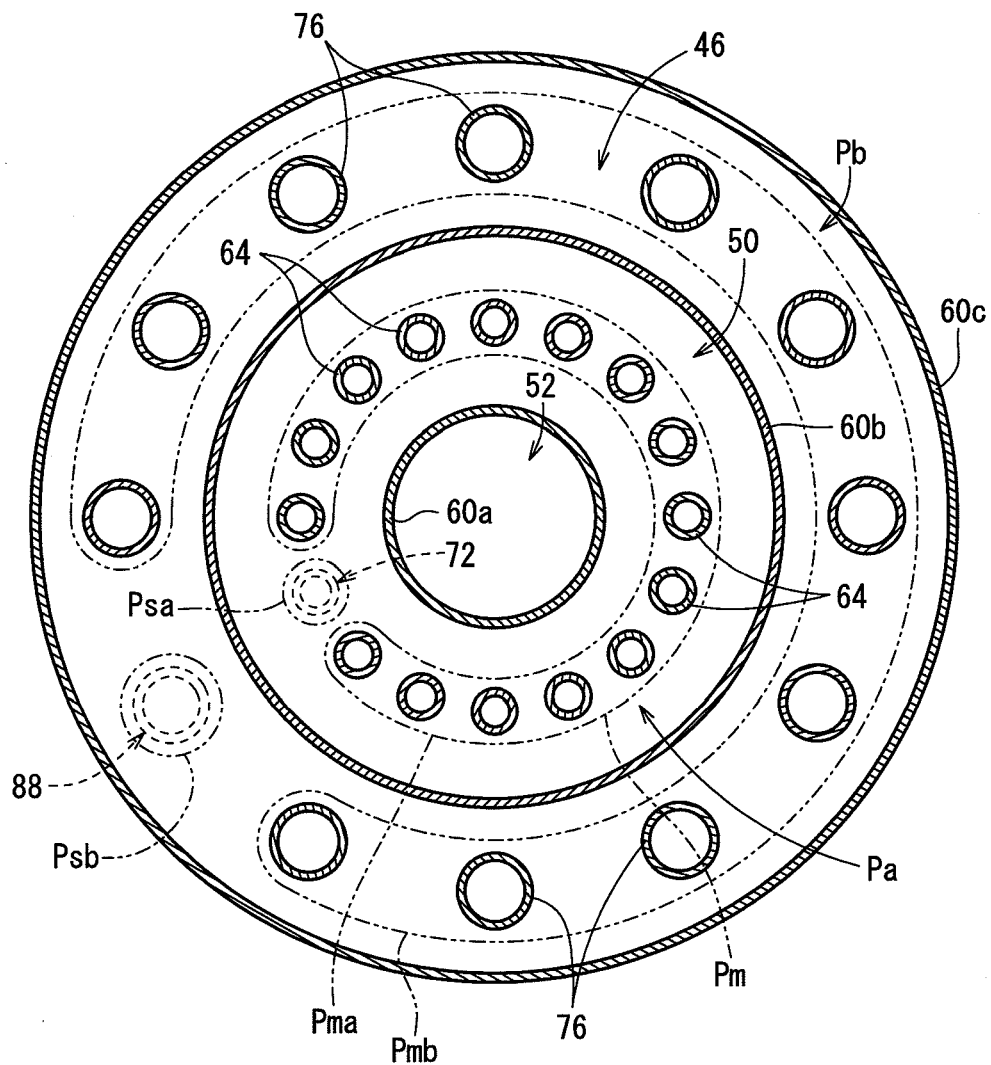
FIG. 7 is a plan view showing the FC peripheral equipment.

As shown in FIG. 7, the heat exchange pipes 64 are provided in an annular placement area Pa formed between the oxygen-containing gas supply chamber 70a and the oxygen-containing gas discharge chamber 70b. The annular placement area Pa includes a sparse area Psa where the heat exchange pipes 64 are sparsely positioned, and a dense area Pma where the heat exchange pipes 64 are densely positioned. The sparse area Psa is positioned on an extension line from the oxygen-containing gas inlet pipe 72.

As shown in FIGS. 1 and 2, one end of an oxygen-containing gas channel 74 is connected to the oxygen-containing gas discharge chamber 70b, and the other end of the oxygen-containing gas channel 74 is connected to the oxygen-containing gas supply passage 42a of the fuel cell stack 24.

The reformer 46 is a preliminary reformer for reforming higher hydrocarbon ($C_{2+}$) such as ethane ($C_2H_6$), propane ($C_3H_8$), and butane ($C_4H_{10}$) in the city gas (raw fuel) to produce the fuel gas chiefly containing methane ($CH_4$), hydrogen, and CO by steam reforming. The operating temperature of the reformer 46 is several hundred ° C.

As shown in FIGS. 2 and 3, the reformer 46 includes a plurality of reforming pipes (heat transmission pipes) 76 provided around the heat exchanger 50. The reforming pipes 76 are fixed to the second inner ring 78a at one end, and fixed to the second inner ring 78b at the other end.

A second outer ring 80a is provided outside the second inner ring 78a, and a second outer ring 80b is provided outside the second inner ring 78b. The second inner rings 78a, 78b and the second outer rings 80a, 80b are fixed to the outer circumferential surface of the second partition plate 60b and the inner circumferential surface of the third partition plate 60c.

An annular mixed gas supply chamber 82a is formed between the second inner ring 78a and the second outer ring 80a, and a mixed gas of raw fuel and water vapor is supplied to the mixed gas supply chamber 82a. An annular reformed gas discharge chamber 82b is formed between the second inner ring 78b and the second outer ring 80b, and the produced fuel gas (reformed gas) is discharged to the reformed gas discharge chamber 82b.

Both ends of each of the reforming pipes 76 are opened to the mixed gas supply chamber 82a and the reformed gas discharge chamber 82b. The inside of each of the reforming pipes 76 is filled with reforming catalyst pellets 84. Metal meshes 86 are provided at both ends of the reforming pipes 76 for supporting the catalyst pellets 84. A raw fuel supply pipe 88 is connected to the mixed gas supply chamber 82a as an annular space, and an evaporation return pipe 102 as described later is connected to a position in the middle of the raw fuel supply pipe 88.

Figure 8:
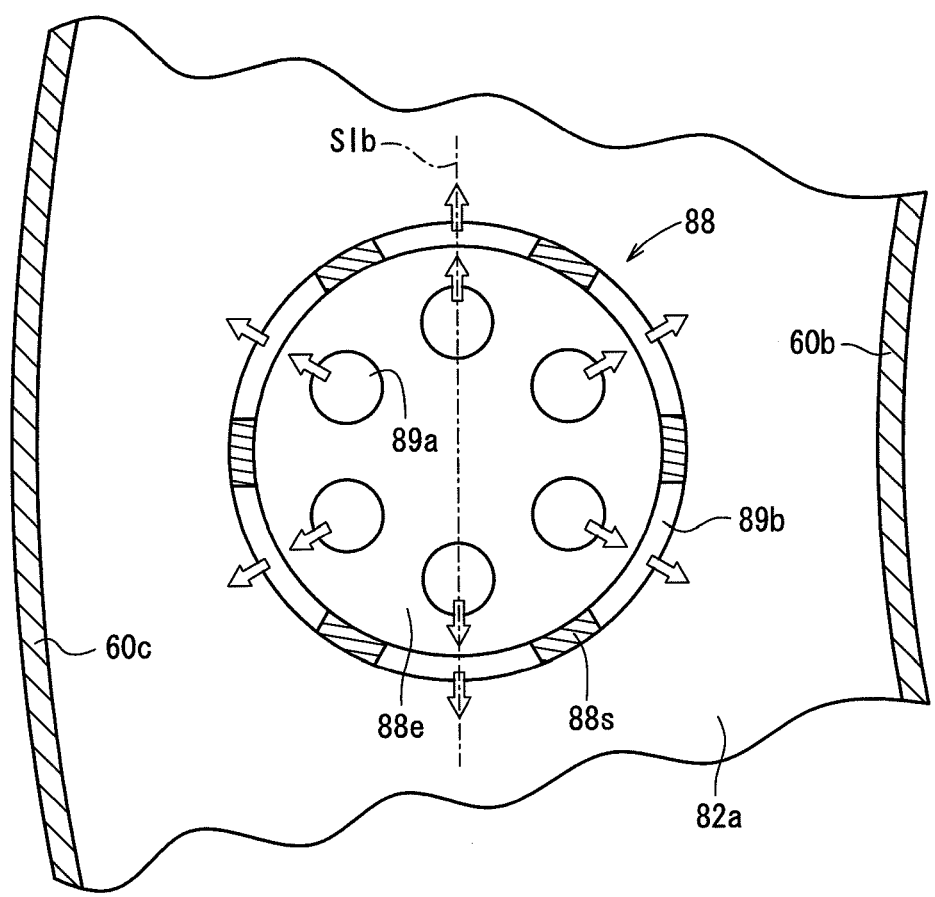
FIG. 8 is a plan view showing an end of a mixed gas inlet pipe of the FC peripheral equipment.

As shown in FIG. 8, a plurality of first inlet holes 89a extend through an axial end surface 88e of the raw fuel supply pipe 88 in an axial direction. A plurality of second inlet holes 89b extend through a circumferential end surface 88s of the raw fuel supply pipe 88 radially.

The axial end surface 88e has a flat circular disk shape, and a plurality of, e.g., the six first inlet holes 89a are formed along a circle around the center of the circular disk, at equal intervals of angle. A plurality of, e.g., the six second inlet holes 89b are formed in the circumferential end surface 88s at equal intervals of angle. Each of the first inlet holes 89a has a circular opening, and each of the second inlet holes 89b has a rectangular (quadrilateral) opening. The total area of openings of the first inlet holes 89a is smaller than the total area of openings of the second inlet holes 89b.

Two of the second inlet holes 89b of the raw fuel supply pipe 88 that are positioned radially opposite to each other are arranged in parallel to a tangential direction S1b of the mixed gas supply chamber 82a as reference inlet holes, and the other second inlet holes 89b are spaced at equal intervals of angle from the reference inlet holes.

In the case where the diameter of the raw fuel supply pipe 88 is large, the tangential direction S1b is in parallel to the tangential direction at the point where the outer circumference of the raw fuel supply pipe 88 contacts the outer circumference of the second partition plate 60b and/or at the point where the outer circumference of the raw fuel supply pipe 88 contacts the inner circumference of the third partition plate 60c. The first inlet holes 89a are arranged on a connection line connecting the second inlet holes 89b that are positioned opposite to each other.

As shown in FIG. 7, the reforming pipes 76 are provided in an annular placement area Pb formed between the mixed gas supply chamber 82a and the reformed gas discharge chamber 82b. The annular placement area Pb includes a sparse area Psb where the reforming pipes 76 are sparsely positioned, and a dense area Pmb where the reforming pipes 76 are densely positioned. The sparse area Psb is positioned on an extension line from the raw fuel supply pipe 88.

As shown in FIG. 1, one end of a fuel gas channel 90 is connected to the reformed gas discharge chamber 82b, and the other end of the fuel gas channel 90 is connected to the fuel gas supply passage 44a of the fuel cell stack 24.

The evaporator 48 includes a plurality of evaporation pipes (heat transmission pipes) 92 provided around the reformer 46. The evaporation pipes 92 are fixed to the third inner ring 94a at one end, and fixed to the third inner ring 94b at the other end.

A third outer ring 96a is provided outside the third inner ring 94a, and a third outer ring 96b is provided outside the third inner ring 94b. The third inner rings 94a, 94b and the third outer rings 96a, 96b are fixed to the outer circumferential surface of the third partition plate 60c and the inner circumferential surface of the fourth partition plate 60d.

An annular water supply chamber 98a is formed between the third inner ring 94a and the third outer ring 96a, and water is supplied to the water supply chamber 98a. An annular water vapor discharge chamber 98b is formed between the third inner ring 94b and the third outer ring 96b, and water vapor is discharged to the water vapor discharge chamber 98b. Both ends of the evaporation pipes 92 are opened to the water supply chamber 98a and the water vapor discharge chamber 98b.

A water channel 100 is connected to the water supply chamber 98a. One end of the evaporation return pipe 102 having at least one evaporation pipe 92 is provided in the water vapor discharge chamber 98b, and the other end of the evaporation return pipe 102 is connected to a position in the middle of the raw fuel supply pipe 88 (see FIG. 1). The raw fuel supply pipe 88 has an ejector function, and generates negative pressure by the flow of the raw fuel for sucking the water vapor.

As shown in FIG. 1, the raw fuel supply apparatus 14 includes a raw fuel channel 104. The raw fuel channel 104 is branched into the raw fuel supply pipe 88 and the raw fuel supply pipe 58 through a raw fuel regulator valve 106. A desulfurizer 108 for removing sulfur compounds in the city gas (raw fuel) is provided in the raw fuel supply pipe 88.

The oxygen-containing gas supply apparatus 16 includes an oxygen-containing gas channel 110. The oxygen-containing gas channel 110 is branched into the oxygen-containing gas inlet pipe 72 and the air supply pipe 57 through an oxygen-containing gas regulator valve 112. The water supply apparatus 18 is connected to the evaporator 48 through the water channel 100.

Figure 9:
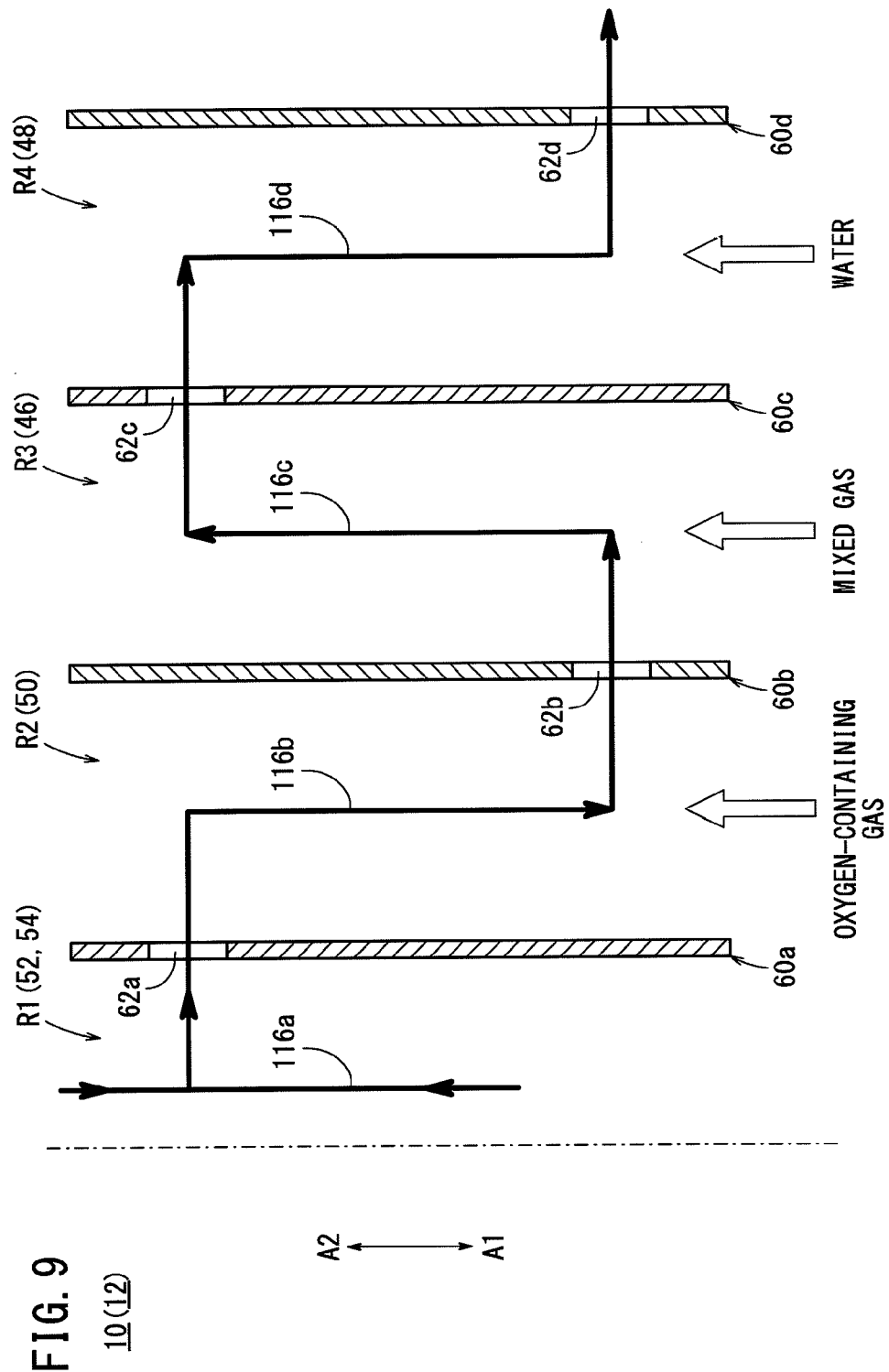
FIG. 9 is a view showing gas flows of a combustion gas in the FC peripheral equipment.

As schematically shown in FIG. 9, a first combustion gas channel 116a as a passage of the combustion gas is formed in the first area R1, a second combustion gas channel 116b as a passage of the combustion gas in a direction indicated by an arrow A1 is formed in the second area R2, a third combustion gas channel 116c as a passage of the combustion gas in a direction indicated by an arrow A2 is formed in the third area R3, and a fourth combustion gas channel 116d as a passage of the combustion gas in the direction indicated by the arrow A1 is formed in the fourth area R4.

Next, operation of the fuel cell system 10 will be described below.

At the time of starting operation of the fuel cell system 10, the air (oxygen-containing gas) and the fuel gas are supplied to the start-up combustor 54. Specifically, in the oxygen-containing gas supply apparatus 16, by operation of the air pump, air is supplied to the oxygen-containing gas channel 110. By adjusting the opening angle of the oxygen-containing gas regulator valve 112, the air is supplied to the air supply pipe 57.

In the meanwhile, in the raw fuel supply apparatus 14, by operation of the fuel gas pump, for example, raw fuel such as the city gas (containing $CH_4$, $C_2H_6$, $C_3H_8$, $C_4H_{10}$) is supplied to the raw fuel channel 104. By regulating the opening angle of the raw fuel regulator valve 106, the raw fuel is supplied into the raw fuel supply pipe 58. The raw fuel is mixed with the air, and supplied into the start-up combustor 54 (see FIG. 2).

Thus, the mixed gas of the raw fuel and the air is supplied into the start-up combustor 54, and the mixed gas is ignited to start combustion. Therefore, in the exhaust gas combustor 52 directly connected to the start-up combustor 54, the combustion gas from the start-up combustor 54 flows into the first partition plate 60a.

As shown in FIG. 9, the plurality of first combustion gas holes 62a are formed at the end of the first partition plate 60a closer to the fuel cell stack 24. Thus, the combustion gas supplied into the first partition plate 60a passes through the first combustion gas holes 62a, and the combustion gas flows from the first area R1 to the second area R2.

In the second area R2, the combustion gas flows in the direction indicated by the arrow A1, and then, the combustion gas flows through the second combustion gas holes 62b formed in the second partition plate 60b into the third area R3. In the third area R3, the combustion gas flows in the direction indicated by the arrow A2, and then, the combustion gas flows through the third combustion gas holes 62c formed in the third partition plate 60c into the fourth area R4. In the fourth area R4, the combustion gas flows in the direction indicated by the arrow A1, and then, the combustion gas is discharged to the outside from the fourth combustion gas holes 62d formed in the fourth partition plate 60d.

The heat exchanger 50 is provided in the second area R2, the reformer 46 is provided in the third area R3, and the evaporator 48 is provided in the fourth area R4. Thus, the combustion gas discharged from the first area R1 heats the heat exchanger 50, then, heats the reformer 46, and then, heats the evaporator 48.

Then, after the temperature of the fuel cell module 12 is raised to a predetermined temperature, the oxygen-containing gas is supplied to the heat exchanger 50, and the mixed gas of the raw fuel and the water vapor is supplied to the reformer 46.

Specifically, the opening angle of the oxygen-containing gas regulator valve 112 is adjusted such that the flow rate of the air supplied to the oxygen-containing gas inlet pipe 72 is increased, and the opening angle of the raw fuel regulator valve 106 is adjusted such that the flow rate of the raw fuel supplied to the raw fuel supply pipe 88 is increased. Further, by operation of the water supply apparatus 18, the water is supplied to the water channel 100.

Thus, as shown in FIGS. 2 and 3, the air which flowed into the heat exchanger 50 is temporarily supplied to the oxygen-containing gas supply chamber 70a. While the air is moving inside the heat exchange pipes 64, the air is heated by heat exchange with the combustion gas supplied into the second area R2. After the heated air is temporarily supplied to the oxygen-containing gas discharge chamber 70b, the air is supplied to the oxygen-containing gas supply passage 42a of the fuel cell stack 24 through the oxygen-containing gas channel 74 (see FIG. 1).

In the fuel cell stack 24, after the heated air flows through the oxygen-containing gas flow field 38, the oxygen-containing gas is discharged from the oxygen-containing gas discharge passage 42b into the oxygen-containing exhaust gas channel 63a. The oxygen-containing exhaust gas channel 63a is opened to the inside of the first partition plate 60a of the exhaust gas combustor 52, and the oxygen-containing exhaust gas flows into the first partition plate 60a.

Further, as shown in FIG. 1, the water from the water supply apparatus 18 is supplied to the evaporator 48. After sulfur is removed from the raw fuel at the desulfurizer 108, the raw fuel flows through the raw fuel supply pipe 88, and moves toward the reformer 46.

In the evaporator 48, after the water is temporarily supplied to the water supply chamber 98a, while water is moving inside the evaporation pipes 92, the water is heated by the combustion gas flowing through the fourth area R4, and vaporized. After the water vapor flows into the water vapor discharge chamber 98b, the water vapor is supplied to the evaporation return pipe 102 connected to the water vapor discharge chamber 98b. Thus, the water vapor flows inside the evaporation return pipe 102, and flows into the raw fuel supply pipe 88. Then, the water vapor is mixed with the raw fuel to produce the mixed gas.

The mixed gas from the raw fuel supply pipe 88 is temporarily supplied to the mixed gas supply chamber 82a of the reformer 46. The mixed gas moves inside the reforming pipes 76. In the meanwhile, the mixed gas is heated by the combustion gas flowing through the third area R3. By the catalyst pellets 84, steam reforming is performed. After removal (reforming) of hydrocarbon of $C_{2+}$, a reformed gas chiefly containing methane is obtained.

After this reformed gas is heated, the reformed gas is temporarily supplied to the reformed gas discharge chamber 82b as the fuel gas. Thereafter, the fuel gas is supplied to the fuel gas supply passage 44a of the fuel cell stack 24 through the fuel gas channel 90 (see FIG. 1).

In the fuel cell stack 24, after the heated fuel gas flows through the fuel gas flow field 40, the fuel gas is discharged from the fuel gas discharge passage 44b into the fuel exhaust gas channel 63b. The fuel exhaust gas channel 63b is opened to the inside of the first partition plate 60a of the exhaust gas combustor 52, and the fuel exhaust gas is supplied into the first partition plate 60a.

Under the heating operation by the start-up combustor 54, when the temperature of the fuel gas in the exhaust gas combustor 52 exceeds the self-ignition temperature, combustion of the oxygen-containing exhaust gas and the fuel exhaust gas is started inside the first partition plate 60a.

In the first embodiment, the heat exchanger 50 includes the annular oxygen-containing gas supply chamber 70a, the annular oxygen-containing gas discharge chamber 70b, the heat exchange pipes 64, and the second combustion gas channel 116b. The oxygen-containing gas is supplied to the oxygen-containing gas supply chamber 70a, and the heated oxygen-containing gas is discharged to the oxygen-containing gas discharge chamber 70b. The heat exchange pipes 64 are connected to the oxygen-containing gas supply chamber 70a at one end, and connected to the oxygen-containing gas discharge chamber 70*b* at the other end. The second combustion gas channel 116*b* supplies the combustion gas into the space between the heat exchange pipes 64.

Thus, the structure of the heat exchanger 50 is simplified easily, and the production cost is reduced effectively. Further, by changing the volumes of the oxygen-containing gas supply chamber 70*a* and the oxygen-containing gas discharge chamber 70*b*, the length, the diameter, and the number of the pipes, the desired operation can be achieved on various operating conditions, and a wider variety of designs become available.

Further, as shown in FIGS. 5 and 6, the first inlet holes 73*a* extend through the axial end surface 72*e* of the oxygen-containing gas inlet pipe 72 in the axial direction, and the second inlet holes 73*b* extend through the circumferential end surface 72*s* of the oxygen-containing gas inlet pipe 72 radially. The total area of openings of the first inlet holes 73*a* is smaller than the total area of openings of the second inlet holes 73*b*.

Figure 10:
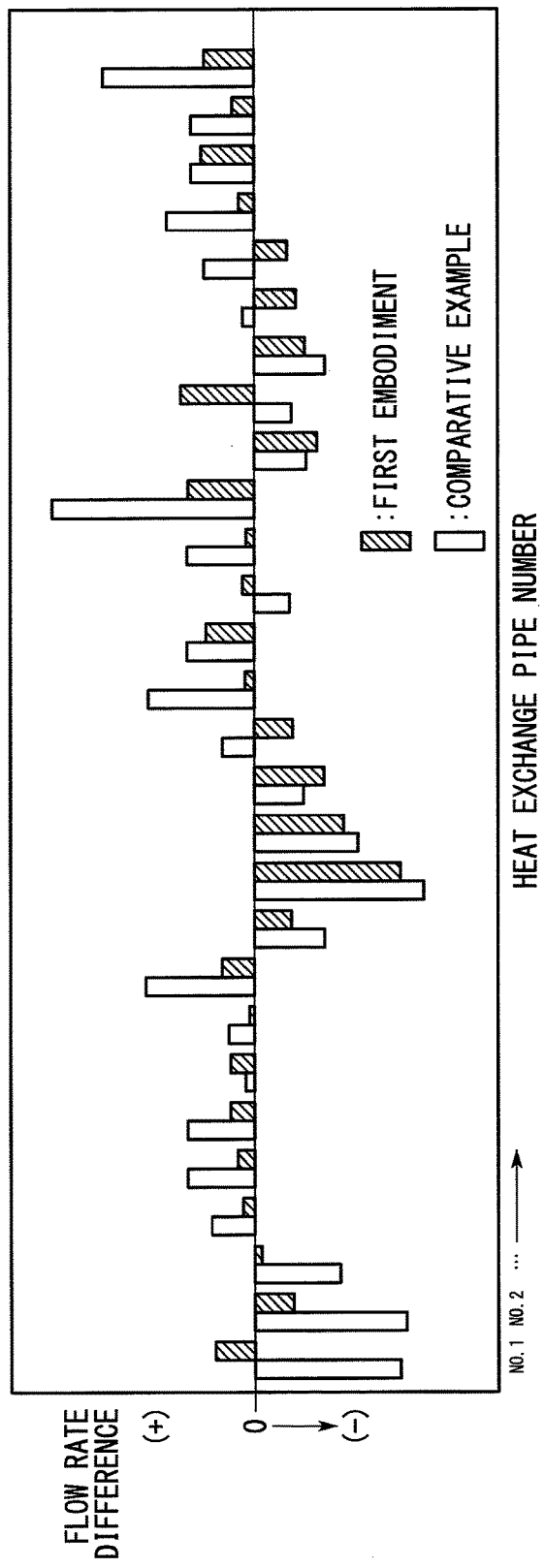
FIG. 10 is a graph showing variation in the flow rate at heat exchange pipes in the first embedment and a comparative example.

In this regard, an experiment for detecting the flow rate of the oxygen-containing gas flowing through the heat exchange pipes 64 was performed using a comparative example where no first inlet holes 73*a* are provided and only the second inlet holes 73*b* are provided, and the first embodiment of the present invention where the first inlet holes 73*a* and the second inlet holes 73*b* are provided. As a result of the experiment, as shown in FIG. 10, variation in the flow rate at the heat exchange pipes 64 was observed.

Therefore, in the comparative example where only the second inlet holes 73*b* are provided, variation of the flow rate of the oxygen-containing gas at the heat exchange pipes 64 is large. In contrast, in the first embodiment, variation in the flow rate of the oxygen-containing gas at the heat exchange pipes 64 can be reduced. Thus, the oxygen-containing gas can be distributed to each of the heat exchange pipes 64 uniformly. The temperature distribution in the fuel cell module 12 becomes uniform, and improvement in the durability and the heat exchange efficiency is achieved.

Further, the heat exchange pipes 64 are provided in the annular placement area Pa formed between the oxygen-containing gas supply chamber 70*a* and the oxygen-containing gas discharge chamber 70*b*. As shown in FIG. 7, the annular placement area Pa includes the sparse area Psa where the heat exchange pipes 64 are sparsely positioned, and the dense area Pma where the heat exchange pipes 64 are densely positioned. The sparse area Psa is positioned on the extension line from the oxygen-containing gas inlet pipe 72.

Thus, the oxygen-containing gas supplied from the first inlet holes 73*a* of the oxygen-containing gas inlet pipe 72 onto the extension line of oxygen-containing gas inlet pipe 72 is not supplied locally to certain heat exchange pipes 64. Accordingly, the oxygen-containing gas is distributed to each of the heat exchange pipes 64 even further uniformly, and improvement in the heat exchange efficiency is achieved.

Further, as shown in FIGS. 5 and 6, two of the second inlet holes 73*b* of the oxygen-containing gas inlet pipe 72 that are positioned radially opposite to each other are arranged in parallel to the tangential direction S1a of the annular placement area Pa as the reference inlet holes, and the other second inlet holes 73*b* are spaced at equal intervals of angle from the reference inlet holes. In the structure, the oxygen-containing gas discharged from the first inlet holes 73*a* and the second inlet holes 73*b* are distributed into the annular placement area Pa uniformly and reliably, and it becomes possible to supply the oxygen-containing gas to each of the heat exchange pipes 64 uniformly.

Further, the first inlet holes 73*a* are positioned on a line connecting the second inlet holes 73*b* that are positioned opposite to each other. In the structure, the orientation in which the oxygen-containing gas is blown out of the first inlet holes 73*a* can be determined freely, and it becomes possible to distribute the oxygen-containing gas to each of the heat exchange pipes 64 further reliably and uniformly.

Further, the reformer 46 includes the annular mixed gas supply chamber 82*a*, the annular reformed gas discharge chamber 82*b*, the reforming pipes 76, and the third combustion gas channel 116*c*. The mixed gas is supplied to the mixed gas supply chamber 82*a*, and the produced fuel gas is discharged to the reformed gas discharge chamber 82*b*. The reforming pipes 76 are connected to the mixed gas supply chamber 82*a* at one end, and connected to the reformed gas discharge chamber 82*b* at the other end. The third combustion gas channel 116*c* supplies the combustion gas into the space between the reforming pipes 76.

The end of the raw fuel supply pipe 88 for guiding the mixed gas to the mixed gas supply chamber 82*a* is provided in the mixed gas supply chamber 82*a*. As shown in FIG. 8, the first inlet holes 89*a* extend through the axial end surface 88*e* of the raw fuel supply pipe 88 in the axial direction, and the second inlet holes 89*b* extend through the circumferential end surface 88*s* of the raw fuel supply pipe 88 radially. The total area of openings of the first inlet holes 89*a* is smaller than the total area of openings of the second inlet holes 89*b*.

The reformer 46 includes the annular mixed gas supply chamber 82*a*, the annular reformed gas discharge chamber 82*b*, and the reforming pipes 76 as basic structure. Thus, the structure of the reformer 46 is simplified easily, and the production cost is reduced effectively. Further, by changing the volumes of the mixed gas supply chamber 82*a* and the reformed gas discharge chamber 82*b*, the length, the diameter, and the number of the pipes, the desired operation can be achieved on various operating conditions, and a wider variety of designs become available.

In this regard, the total area of openings of the first inlet holes 89*a* formed in the axial end surface 88*e* of the raw fuel supply pipe 88 is smaller than the total area of openings of the second inlet holes 89*b* formed in the circumferential end surface 88*s* of the raw fuel supply pipe 88. In the structure, it becomes possible to distribute the mixed gas to each of the reforming pipes 76, the temperature distribution in the fuel cell module 12 becomes uniform, and improvement in the durability and reforming efficiency is achieved.

Further, the reforming pipes 76 are provided in the annular placement area Pb formed between the mixed gas supply chamber 82*a* and the reformed gas discharge chamber 82*b*. As shown in FIG. 7, the annular placement area Pb includes the sparse area Psb where the reforming pipes 76 are sparsely positioned, and the dense area Pmb where the reforming pipes 76 are densely positioned. The sparse area Psb is positioned on the extension line from the raw fuel supply pipe 88.

Thus, the mixed gas supplied from the first inlet holes 89*a* of the raw fuel supply pipe 88 onto the extension line of the raw fuel supply pipe 88 is not supplied locally to certain reforming pipes 76, for avoiding concentration of the supplied gas. Accordingly, the mixed gas is distributed to each of the reforming pipes 76 uniformly, and improvement in the reforming efficiency is achieved.

Further, two of the second inlet holes 89*b* of the raw fuel supply pipe 88 that are positioned radially opposite to each other are arranged in parallel to the tangential direction S1b of the annular placement area Pb as the reference inlet holes, and the other second inlet holes 89*b* are spaced at equal intervals of angle from the reference inlet holes. In the structure, the mixed gas discharged from the first inlet holes 89*a* and the second inlet holes 89*b* are distributed into the annular placement area Pb uniformly and reliably, and it becomes possible to supply the mixed gas to each of the reforming pipes 76 uniformly.

Further, the first inlet holes 89*a* are positioned on a line connecting the second inlet holes 89*b* that are positioned opposite to each other. In the structure, the orientation in which the mixed gas is blown out of the first inlet holes 89*a* can be determined freely, and it becomes possible to further reliably and uniformly distribute the mixed gas to each of the reforming pipes 76.

Further, in the first embodiment, the FC peripheral equipment 56 includes the first area R1 where the exhaust gas combustor 52 and the start-up combustor 54 are provided, the annular second area R2 around the first area R1 where the heat exchanger 50 is provided, the annular third area R3 around the second area R2 where the reformer 46 is provided, and the annular fourth area R4 around the third area R3 where the evaporator 48 is provided.

The annular second area R2 is provided around the first area R1 at the center where the exhaust gas combustor 52 and the start-up combustor 54 are included, and the annular third area R3 is provided around the second area R2, and the annular fourth area R4 is provided around the third area R3. That is, the first area R1 is provided at the center, and the annular second area R2, the annular third area R3, and the annular fourth area R4 are provided around the first area R1, successively.

In the structure, high temperature equipment with a large heat demand such as the heat exchanger 50 (and the reformer 46) can be provided inside, and low temperature equipment with a small heat demand such as the evaporator 48 can be provided outside.

For example, the heat exchanger 50 requires the temperature in a range of 550° C. to 650° C., and the reformer 46 requires the temperature in a range of 550° C. to 600° C. The evaporator 48 requires the temperature in a range of 150° C. to 200° C.

Thus, improvement in the heat efficiency is achieved, and thermally self-sustaining operation is facilitated. Further, simple and compact structure is achieved. In particular, since the heat exchanger 50 is provided inside the reformer 46, the reformer 46 suitable for reforming at low temperature can be used advantageously in an environment where the A/F (air/fuel) ratio is relatively low. Thermally self-sustaining operation herein means operation where the entire amount of heat quantity required for operating the fuel cell 22 is maintained using only heat energy generated in the fuel cell 22, without supplying additional heat from the outside.

Further, the fuel cell module 12 is a solid oxide fuel cell module. Therefore, the fuel cell module 12 is most suitable as high temperature type fuel cells such as SOFC.

Figure 11:
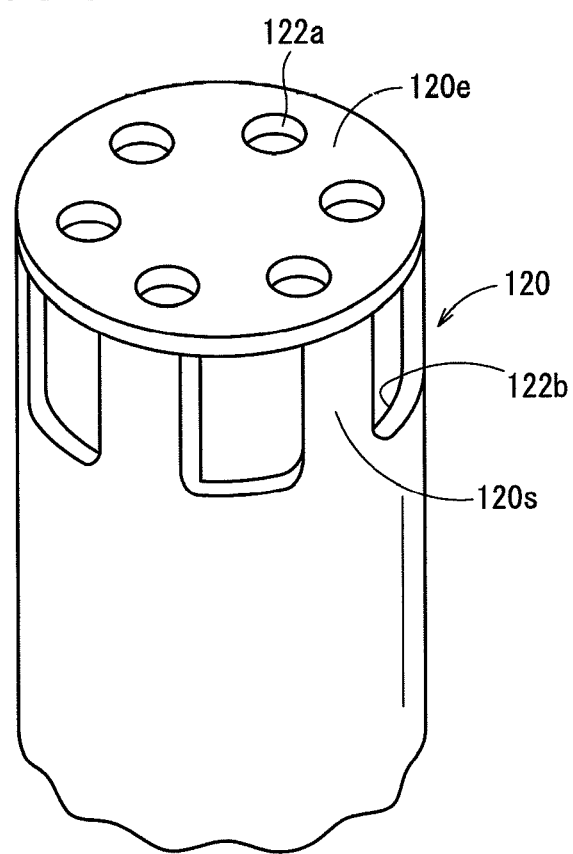
FIG. 11 is a perspective view showing another oxygen-containing gas inlet pipe.
Figure 12:
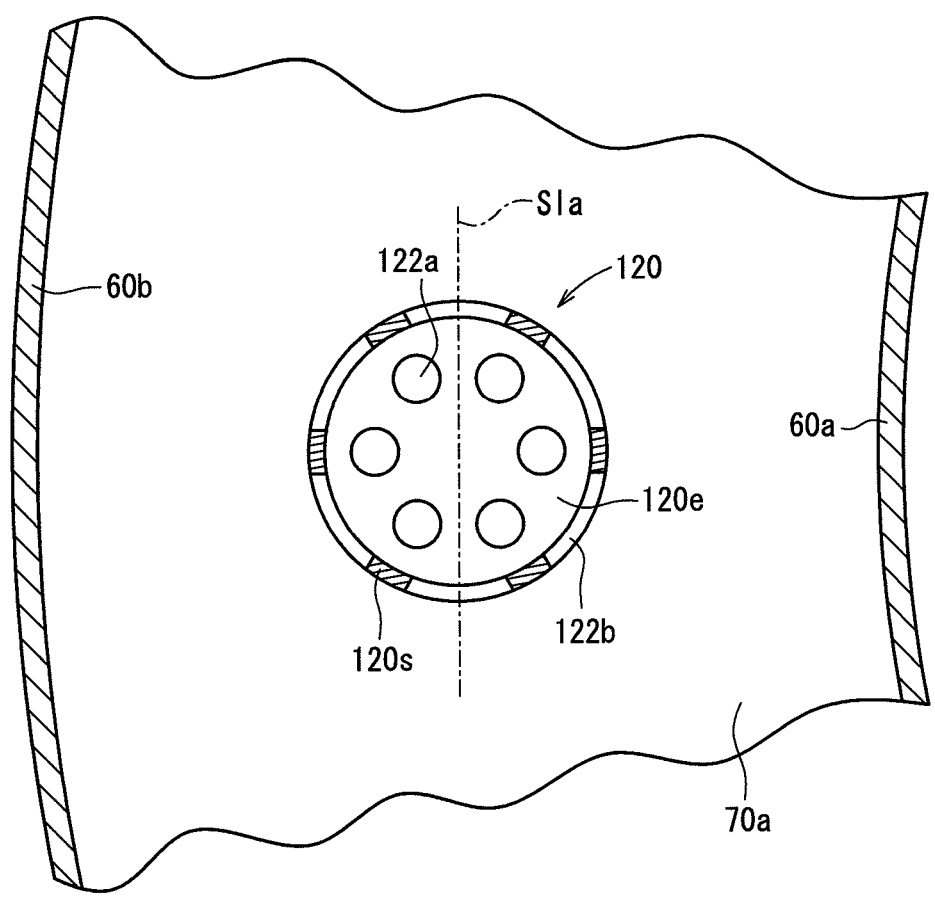
FIG. 12 is a plan view showing the other oxygen-containing gas inlet pipe.

It should be noted that an oxygen-containing gas inlet pipe 120 as shown in FIGS. 11 and 12 can be used instead of the oxygen-containing gas inlet pipe 72. A plurality of first inlet holes 122*a* extend through an axial end surface 120*e* of the oxygen-containing gas inlet pipe 120 in an axial direction. A plurality of second inlet holes 122*b* extend through a circumferential end surface 120*s* of the oxygen-containing gas inlet pipe 120 radially at equal intervals of angle. The total area of openings of the first inlet holes 122*a* is smaller than the total area of openings of the second inlet holes 122*b*.

Two of the second inlet holes 122*b* of the oxygen-containing gas inlet pipe 120 that are positioned radially opposite to each other are arranged in parallel to a tangential direction S1a of the oxygen-containing gas supply chamber 70*a* as reference inlet holes, and the other second inlet holes 122*b* are spaced at equal intervals of angle from the reference inlet holes. The first inlet holes 122*a* are positioned on a line offset from a connection line connecting the second inlet holes 122*b* that are positioned opposite to each other.

In this oxygen-containing gas inlet pipe 120, the orientation in which the oxygen-containing gas is blown out of the first inlet holes 122*a* can be determined freely, and it becomes possible to distribute the oxygen-containing gas to each of the reforming pipes 76 further reliably and uniformly. The raw fuel supply pipe 88 may have the same structure as the oxygen-containing gas inlet pipe 120.

Figure 13:
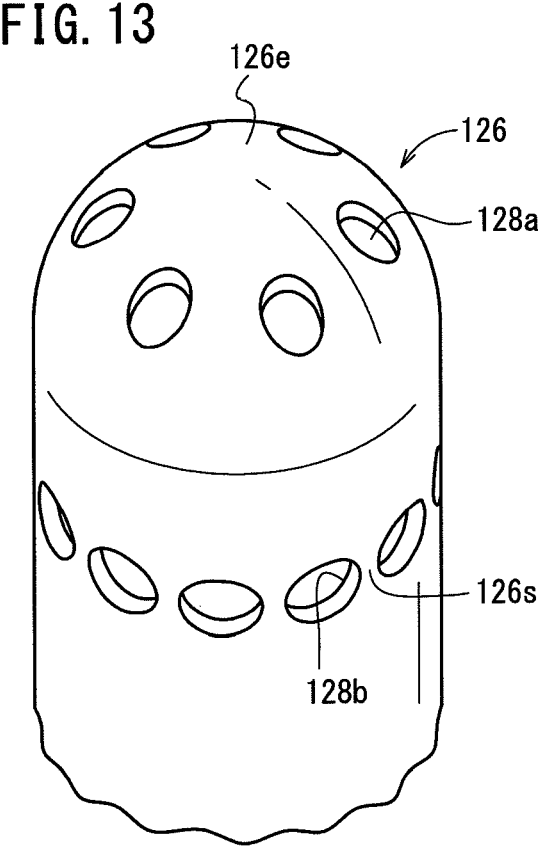
FIG. 13 is a perspective view showing a front end of another oxygen-containing gas inlet pipe.

FIG. 13 is a perspective view showing a front end of still another oxygen-containing gas inlet pipe 126. Though not shown, the mixed gas inlet pipe may have the same structure.

The oxygen-containing gas inlet pipe 126 has a spherical end 126*e* in an axial direction, and at the spherical end 126*e*, a plurality of first inlet holes 128*a* are formed at equal intervals of angle around the top portion. A plurality of second inlet holes 128*b* extend through a circumferential end surface 126*s* of the oxygen-containing gas inlet pipe 126 radially at equal intervals of angle. The total area of openings of the first inlet holes 128*a* is smaller than the total area of openings of the second inlet holes 128*b*.

In this oxygen-containing gas inlet pipe 126, in particular, the first inlet holes 128*a* are provided radially at the spherical end 126*e* of the oxygen-containing gas inlet pipe 126. In the structure, the oxygen-containing gas is blown out of the oxygen-containing gas inlet pipe 126 with outward inclination from the axial direction of the oxygen-containing gas inlet pipe 126. Thus, the oxygen-containing gas is distributed further reliably.

Figure 14:
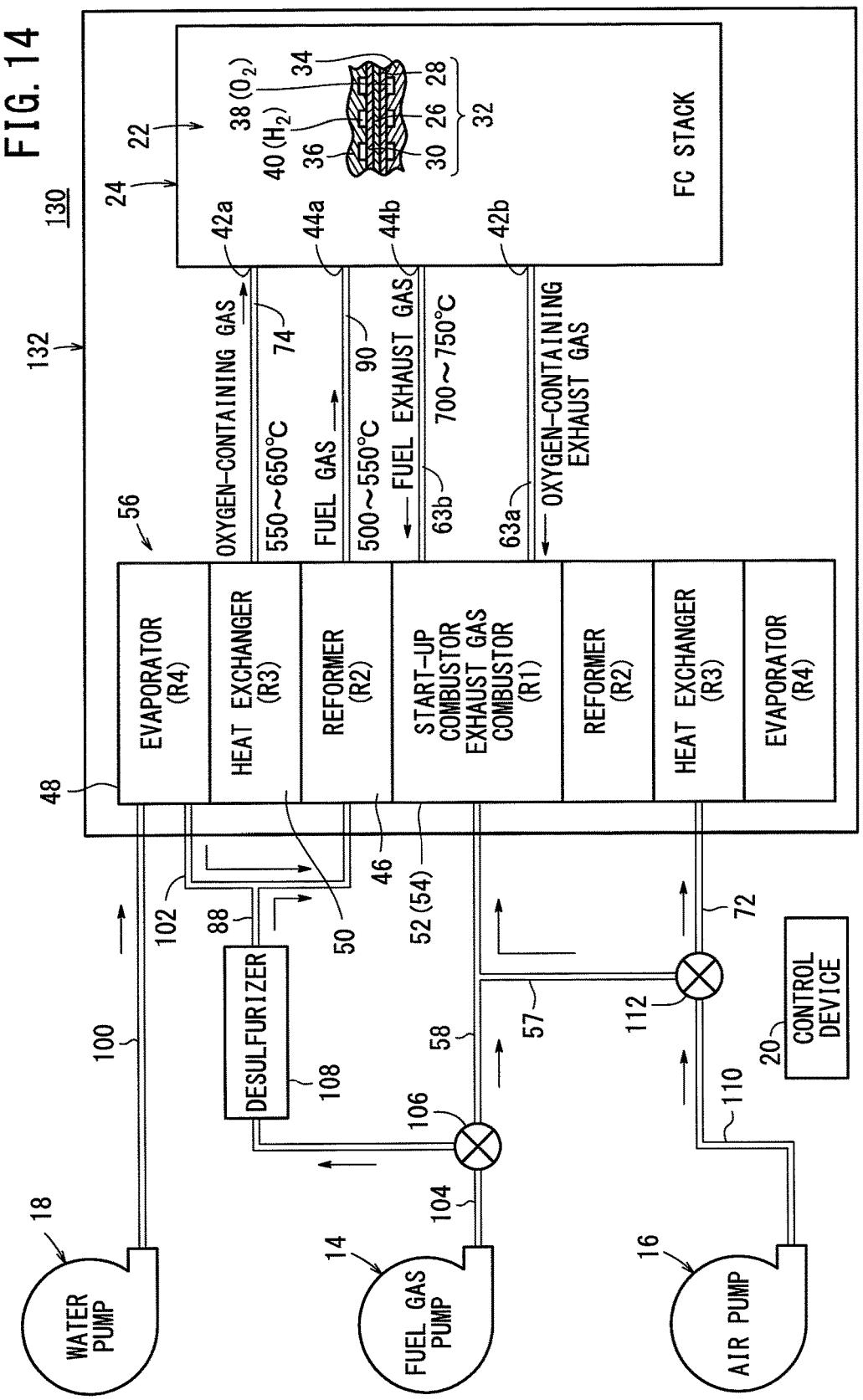
FIG. 14 is a diagram schematically showing structure of a fuel cell system including a fuel cell module according to a second embodiment of the present invention.

As shown in FIG. 14, a fuel cell system 130 includes a fuel cell module 132 according to a second embodiment of the present invention. The constituent elements of the fuel cell module 132 according to the second embodiment of the present invention that are identical to those of the fuel cell module 12 according to the first embodiment are labeled with the same reference numerals, and descriptions thereof will be omitted. Also in third and fourth embodiments as described later, the constituent elements that are identical to those of the fuel cell module 12 according to the first embodiment are labeled with the same reference numerals, and descriptions thereof will be omitted.

Figure 15:
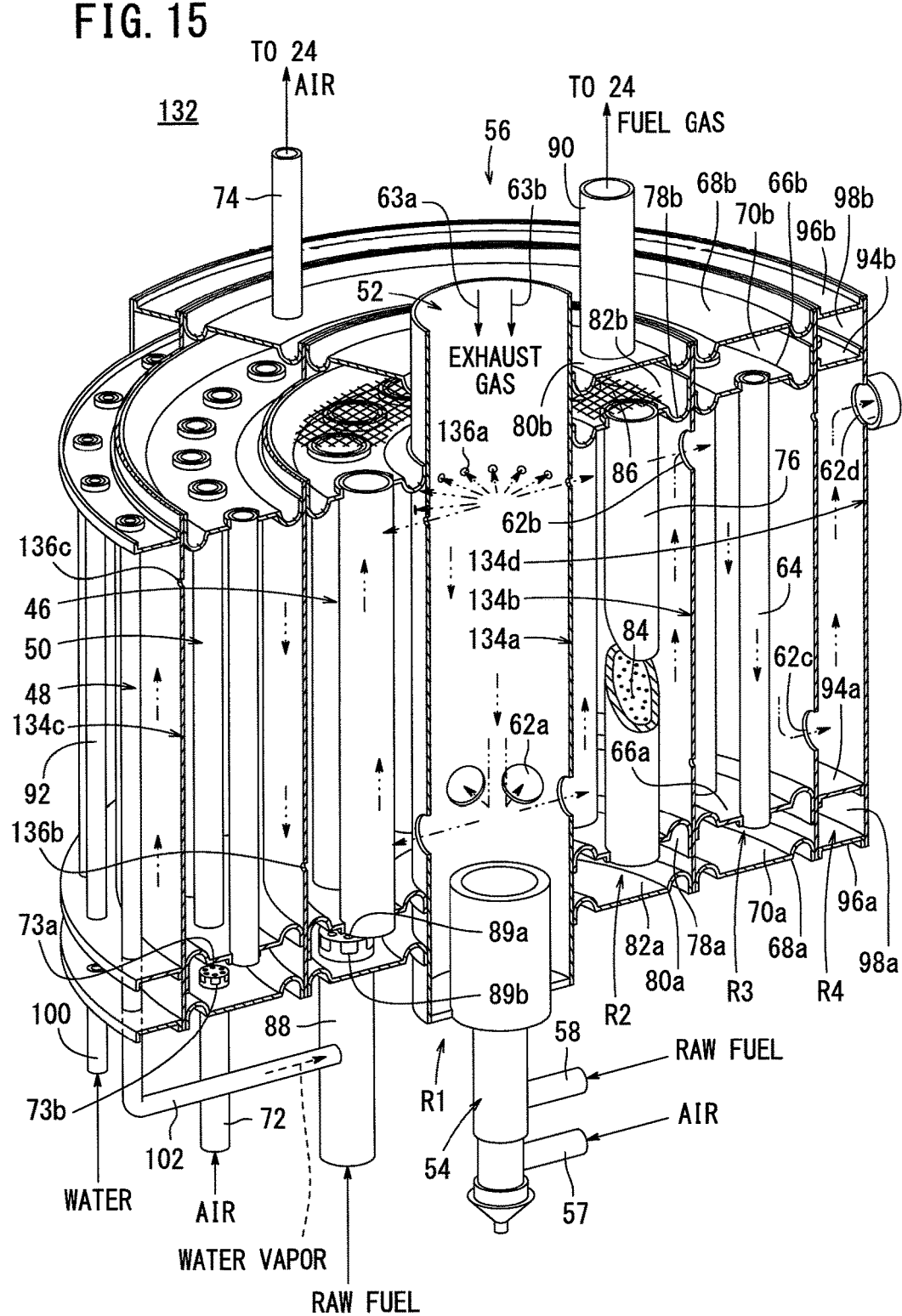
FIG. 15 is a perspective view with partial omission showing FC peripheral equipment of the fuel cell module.

As shown in FIG. 15, FC peripheral equipment 56 of the fuel cell module 132 includes a first area R1 comprising, e.g., a circular opening where an exhaust gas combustor 52 and a start-up combustor 54 are provided, an annular second area R2 around the first area R1 where the reformer 46 is provided, an annular third area R3 around the second area R2 where the heat exchanger 50 is provided, and an annular fourth area R4 around the third area R3 where an evaporator 48 is provided.

The FC peripheral equipment 56 includes a first partition plate 134*a* provided between the first area R1 and the second area R2, a second partition plate 134*b* provided between the second area R2 and the third area R3, a third partition plate 134c provided between the third area R3 and the fourth area R4, and a fourth partition plate 134d around the fourth area R4.

Figure 16:
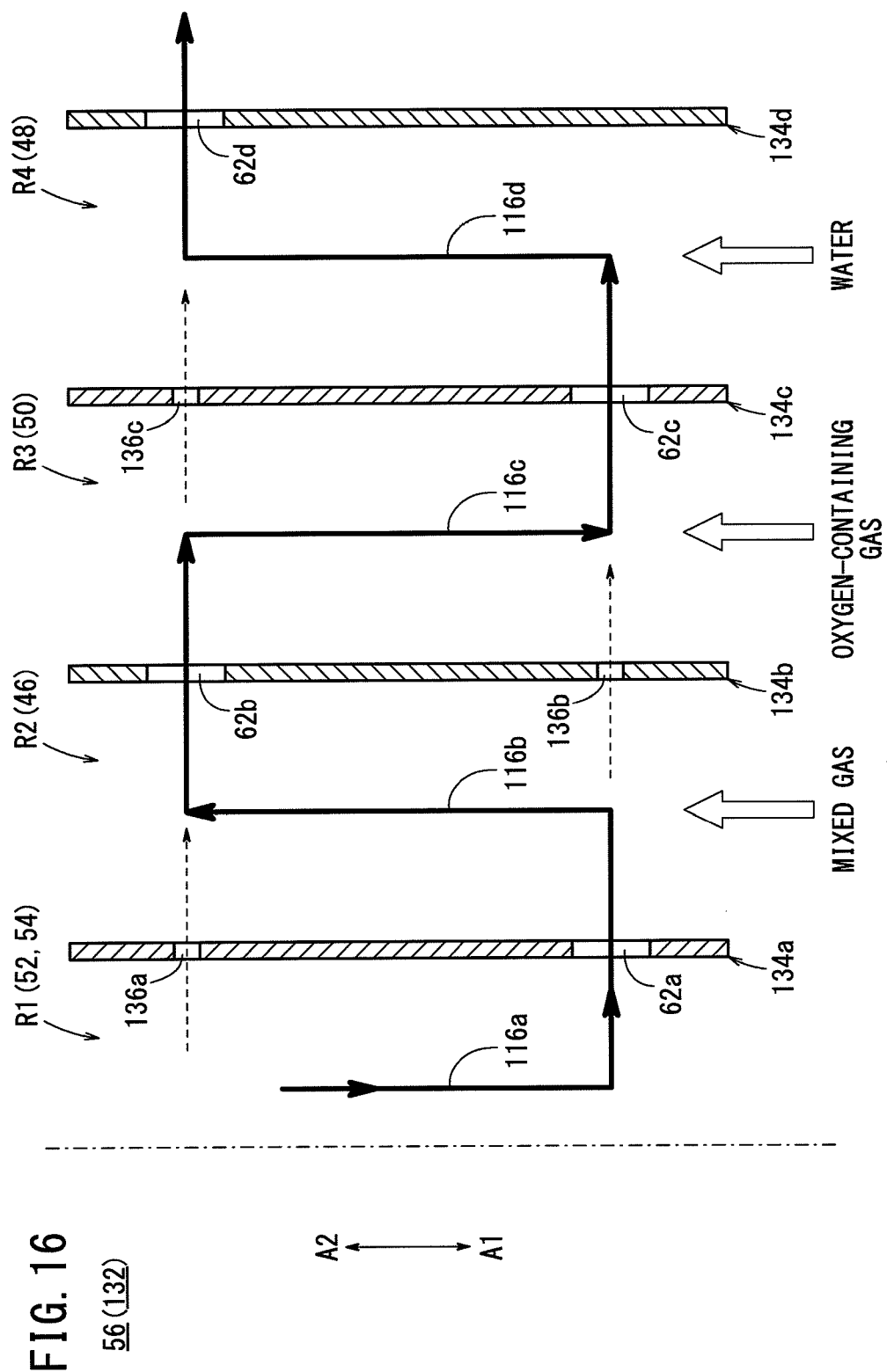
FIG. 16 is a view showing flows of combustion gas in the FC peripheral equipment.

As shown in FIGS. 15 and 16, first combustion gas holes 62a are provided adjacent to the end of the first partition plate 134a opposite to the fuel cell stack 24, second combustion gas holes 62b are provided adjacent to the end of the second partition plate 134b closer to the fuel cell stack 24, third combustion gas holes 62c are provided adjacent to the end of the third partition plate 134c opposite to the fuel cell stack 24, and fourth combustion gas holes 62d are provided adjacent to the end of the fourth partition plate 134d closer to the fuel cell stack 24.

A plurality of steam extraction holes 136a are formed in the first partition plate 134a opposite to the first combustion gas holes 62a. Each of the steam extraction holes 136a has an opening which is smaller than that of the first combustion gas holes 62a. The steam extraction holes 136a are formed at positions facing the second combustion gas holes 62b formed in the second partition plate 134b. A plurality of steam extraction holes 136b are formed in the second partition plate 134b at positions facing the third combustion gas holes 62c formed in the third partition plate 134c. A plurality of steam extraction holes 136c are formed in the third partition plate 134c at positions facing the fourth combustion gas holes 62d formed in the fourth partition plate 134d. The steam extraction holes 136b, 136c are not essential, and should be provided as necessary.

In the second embodiment, in the heat exchanger 50, a plurality of first inlet holes 73a extends through an axial end surface 72e of the oxygen-containing gas inlet pipe 72 in the axial direction, and a plurality of second inlet holes 73b extend through a circumferential end surface 72s of the oxygen-containing gas inlet pipe 72 radially. In the structure, the same advantages as in the case of the first embodiment are obtained. For example, it becomes possible to distribute the oxygen-containing gas to each of the heat exchange pipes 64 uniformly, the temperature distribution in the fuel cell module 132 becomes uniform, and improvement in the durability and heat exchange efficiency is achieved.

Figure 17:
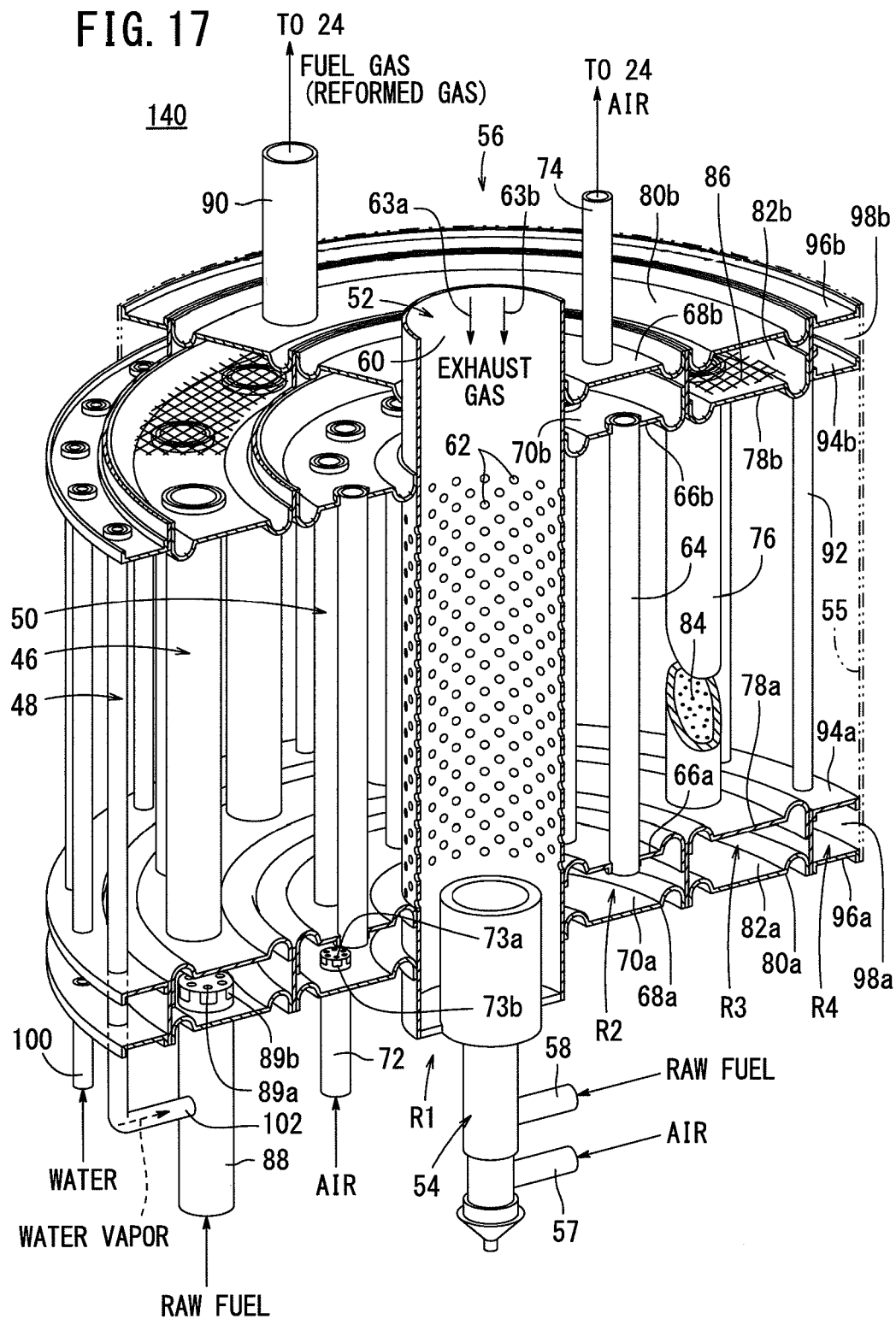
FIG. 17 is a perspective view with partial omission showing FC peripheral equipment of a fuel cell module according to a third embodiment of the present invention.

As shown in FIG. 17, in a fuel cell module 140 according a third embodiment, FC peripheral equipment 56 does not uses the second partition plate 60b, the third partition plate 60c, and the fourth partition plate 60d. A plurality of combustion gas holes 62 are formed in a partition plate 60 forming the first area R1. Positions of the combustion gas holes 62 are dispersed in the axial direction and in the circumferential direction.

As with the case of the first embodiment, the FC peripheral equipment 56 includes a first area R1 comprising, e.g., a circular opening where the exhaust gas combustor 52 and the start-up combustor 54 are provided, an annular second area R2 formed around the first area R1 where the heat exchanger 50 is provided, an annular third area R3 formed around the second area R2 where the reformer 46 is provided, and an annular fourth area R4 formed around the third area R3 where the evaporator 48 is provided.

In the third embodiment, an end of the oxygen-containing gas inlet pipe 72 is provided in the oxygen-containing gas supply chamber 70a, and a plurality of first inlet holes 73a and a plurality of second inlet holes 73b are formed at the end of the oxygen-containing gas inlet pipe 72. Thus, the same advantages as in the case of the first and second embodiments are obtained. For example, it becomes possible to distribute the oxygen-containing gas to each of the heat exchange pipes 64 uniformly, the temperature distribution in the fuel cell module 140 becomes uniform, and improvement in the durability and heat exchange efficiency is achieved. Also in the raw fuel supply pipe 88, the same advantages are obtained.

Figure 18:
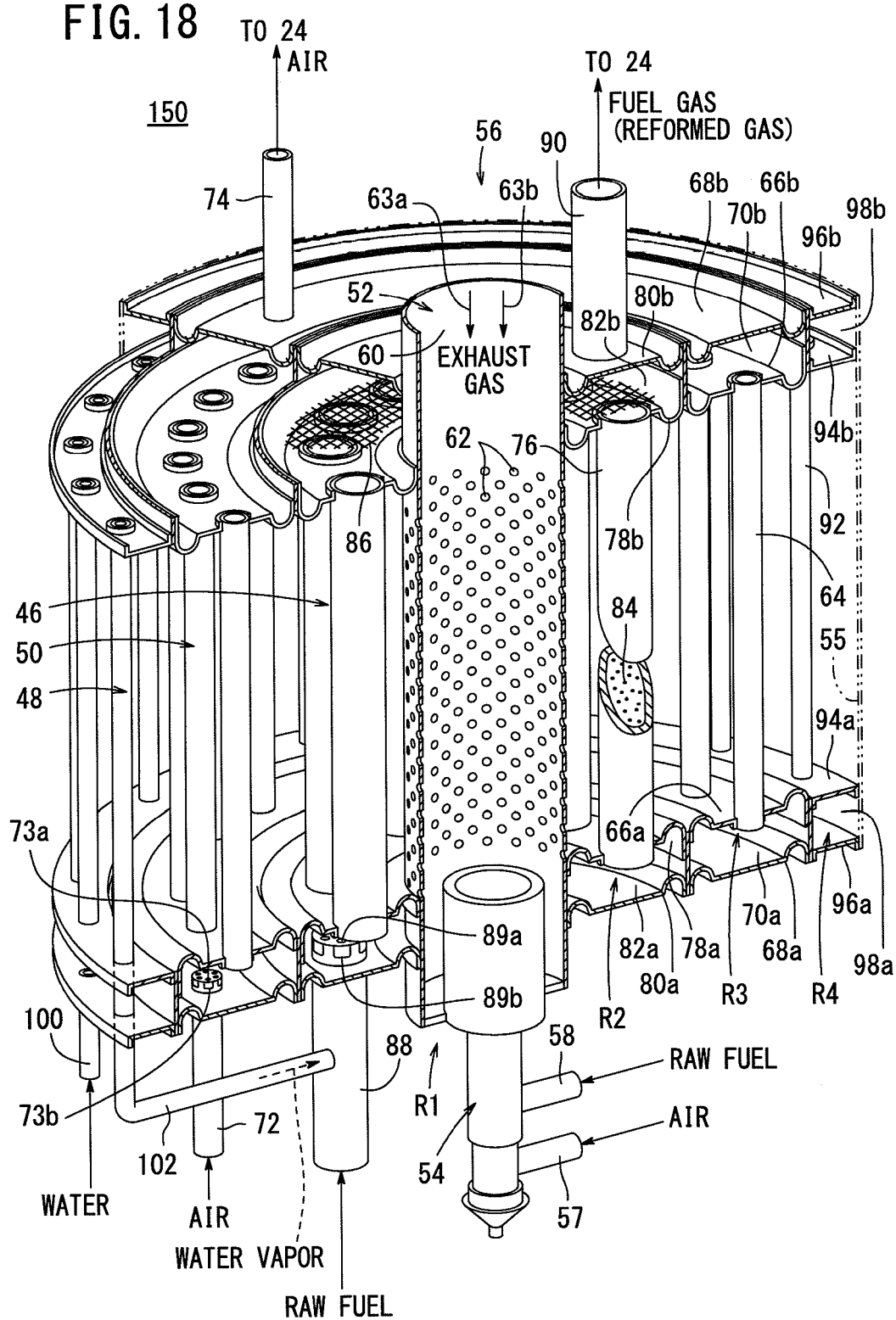
FIG. 18 is a perspective view with partial omission showing FC peripheral equipment according to a fourth embodiment of the present invention.
Figure 19:
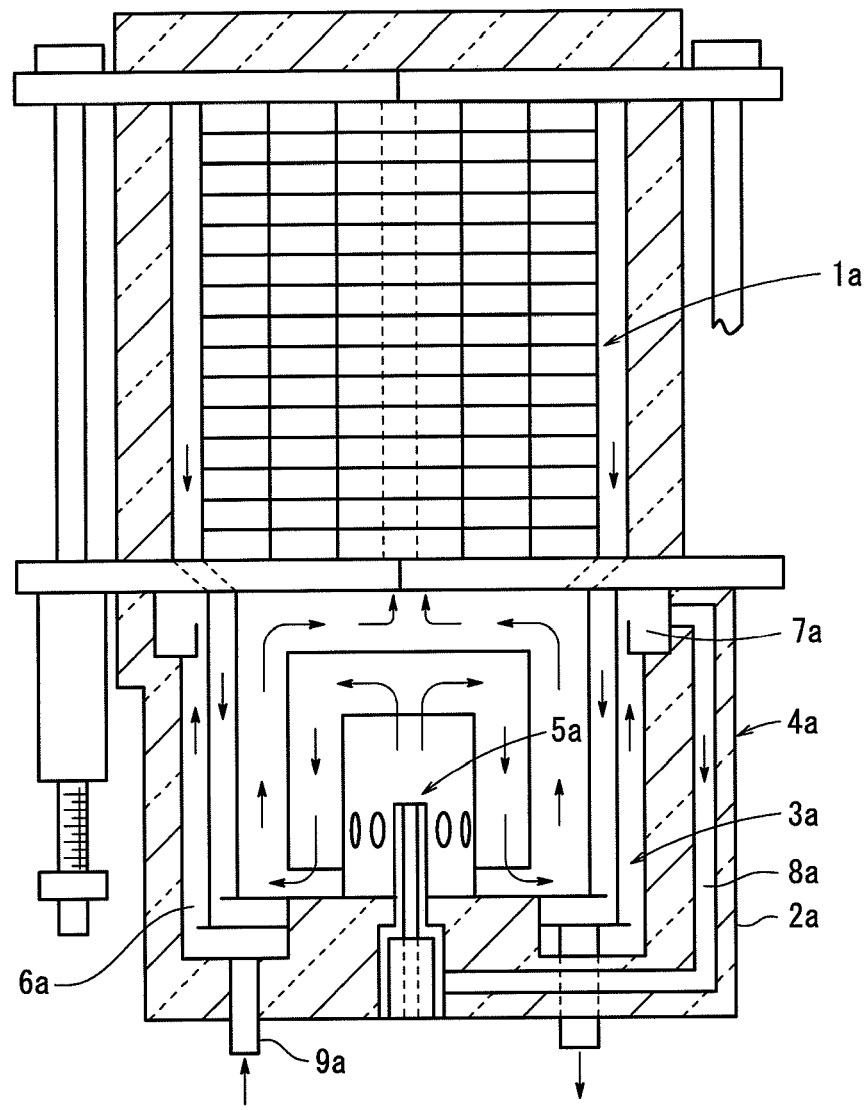
FIG. 19 is a view schematically showing a fuel cell battery disclosed in the conventional technique 1.
Figure 20:
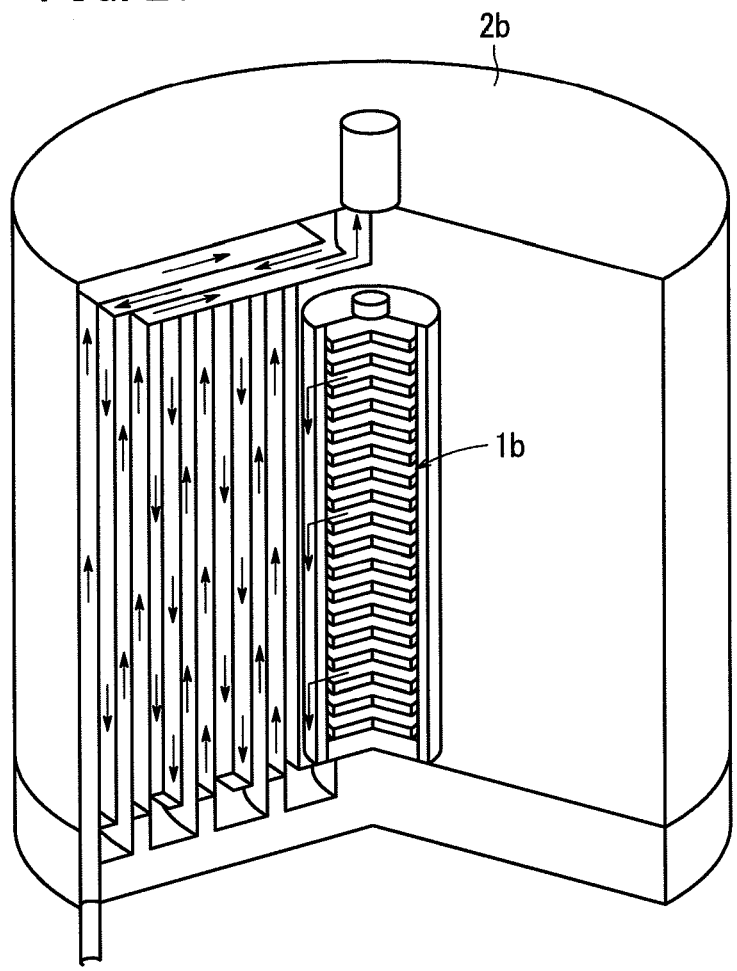
FIG. 20 is a perspective view with partial cutout showing a solid oxide fuel cell disclosed in the conventional technique 2.
Figure 21:
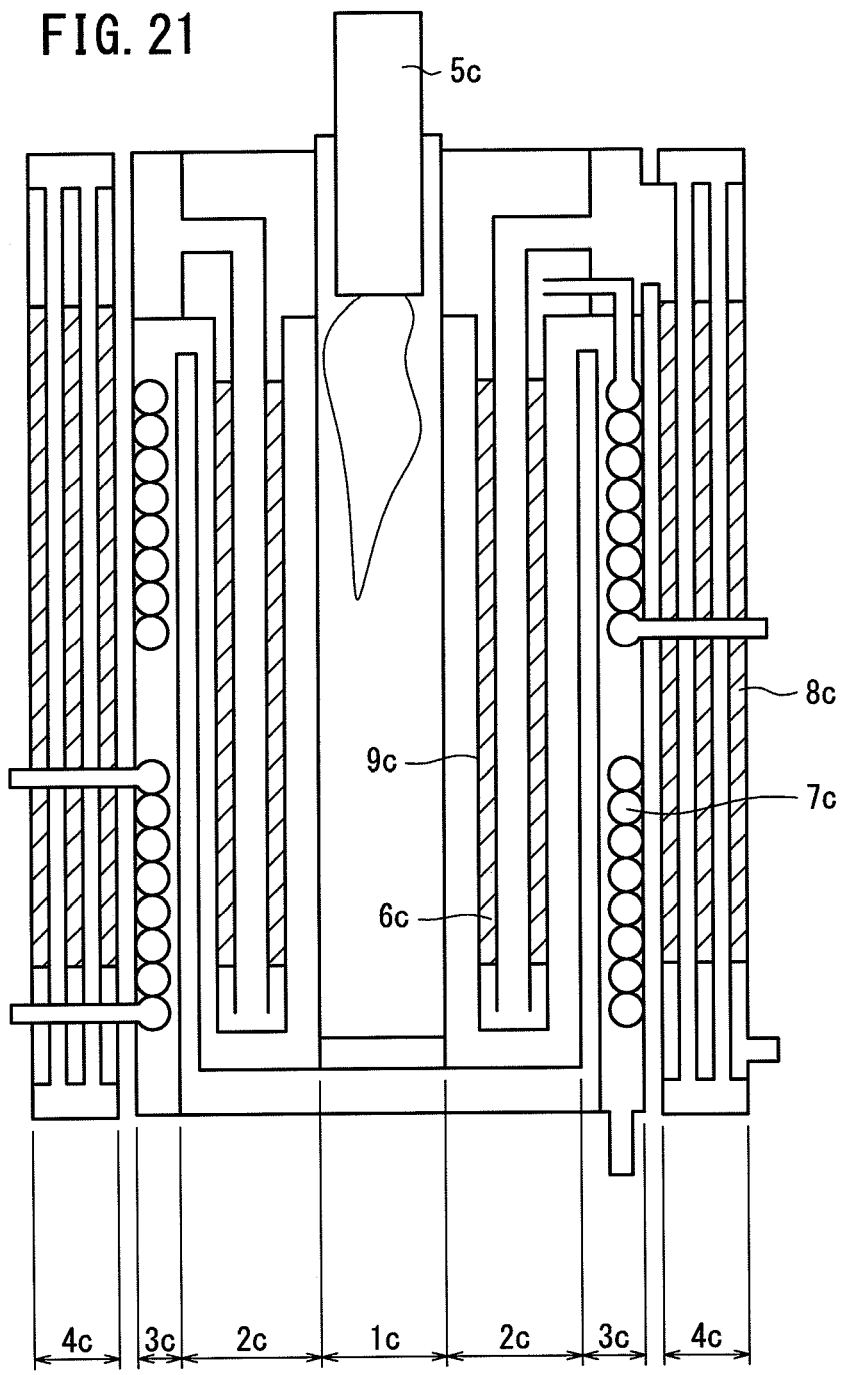
FIG. 21 is a perspective view showing a fuel cell system disclosed in the conventional technique 3.

As shown in FIG. 18, in a fuel cell module 150 according to a fourth embodiment of the present invention, as with the case of the second embodiment, the FC peripheral equipment 56 includes a first area R1 comprising, e.g., a circular opening where the exhaust gas combustor 52 and the start-up combustor 54 are provided, an annular second area R2 formed around the first area R1 where the reformer 46 is provided, an annular third area R3 formed around the second area R2 where the heat exchanger 50 is provided, and an annular fourth area R4 formed around the third area R3 where the evaporator 48 is provided.

Thus, in the fourth embodiment, the same advantages as in the case of the first to third embodiments are obtained.

While the invention has been particularly shown and described with reference to preferred embodiments, it will be understood that variations and modifications can be effected thereto by those skilled in the art without departing from the scope of the invention as defined by the appended claims.

The invention claimed is:

1. A fuel cell module comprising:
a fuel cell stack formed by stacking a plurality of fuel cells for generating electricity by electrochemical reactions of a fuel gas and an oxygen-containing gas;
a reformer for reforming a mixed gas of water vapor and a raw fuel chiefly containing hydrocarbon to produce the fuel gas supplied to the fuel cell stack;
an evaporator for evaporating water, and supplying the water vapor to the reformer;
a heat exchanger for raising a temperature of the oxygen-containing gas by heat exchange with a combustion gas, and supplying the oxygen-containing gas to the fuel cell stack;
an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas; and
a start-up combustor for combusting the raw fuel and the oxygen-containing gas to produce the combustion gas, wherein
the heat exchanger includes an annular oxygen-containing gas supply chamber to which the oxygen-containing gas is supplied, an annular oxygen-containing gas discharge chamber to which the heated oxygen-containing gas is discharged, heat exchange pipes connected to the oxygen-containing gas supply chamber at one end, and connected to the oxygen-containing gas discharge chamber at another end, and a combustion gas channel for supplying the combustion gas to a space between the heat exchange pipes;
an end of an oxygen-containing gas inlet pipe for guiding the oxygen-containing gas to the oxygen-containing gas supply chamber is provided in the oxygen-containing gas supply chamber;
a plurality of first inlet holes extend through an axial end surface of the oxygen-containing gas inlet pipe in an axial direction, and a plurality of second inlet holes extend through a circumferential end surface of the oxygen-containing gas inlet pipe radially;
a total area of openings of the first inlet holes is smaller than a total area of openings of the second inlet holes;
the heat exchange pipes are spaced and arranged annularly in a first annular placement area formed between the oxygen-containing gas supply chamber and the oxygen-containing gas discharge chamber;

the first annular placement area includes a sparse area and a dense area, an interval of adjacent heat exchange pipes of the sparse area is larger than an interval of adjacent heat exchange pipes of the dense area;

the sparse area is positioned on an extension line from the oxygen-containing gas inlet pipe; and two of the second inlet holes of the oxygen-containing gas inlet pipe that are positioned radially opposite to each other are arranged in parallel to a tangential direction of the first annular placement area as reference inlet holes, and other second inlet holes are spaced at equal intervals of angle from the reference inlet holes.

2. The fuel cell module according to claim 1, wherein the first inlet holes are positioned on a connection line connecting the second inlet holes that are positioned opposite to each other, or on a line offset from the connection line.

3. The fuel cell module according to claim 1, wherein the reformer includes an annular mixed gas supply chamber to which the mixed gas is supplied, an annular reformed gas discharge chamber to which the produced fuel gas is discharged, and reforming pipes connected to the mixed gas supply chamber at one end, and connected to the reformed gas discharge chamber at another end, and a combustion gas channel for supplying the combustion gas to a space between the reforming pipes;

an end of a mixed gas inlet pipe for guiding the mixed gas to the mixed gas supply chamber is provided in the mixed gas supply chamber;

a plurality of first inlet holes extend through an axial end surface of the mixed gas inlet pipe in an axial direction, and a plurality of second inlet holes extend through a circumferential end surface of the mixed gas inlet pipe radially;

a total area of openings of the first inlet holes is smaller than a total area of openings of the second inlet holes.

4. The fuel cell module according to claim 3, wherein the reforming pipes are spaced and arranged annularly in a second annular placement area formed between the mixed gas supply chamber and the reformed gas discharge chamber;

the second annular placement area includes a sparse area and a dense area, wherein an interval of adjacent reforming pipes of the sparse area is larger than an interval of adjacent reforming pipes of the dense area; and the sparse area is positioned on an extension line from the mixed gas inlet pipe.

5. The fuel cell module according to claim 4, wherein two of the second inlet holes of the mixed gas inlet pipe that are positioned radially opposite to each other are arranged in parallel to a tangential direction of the second annular placement area as reference inlet holes, and other second inlet holes are spaced at equal intervals of angle from the reference inlet holes.

6. The fuel cell module according to claim 5, wherein the first inlet holes are positioned on a connection line connecting the second inlet holes that are positioned opposite to each other, or on a line offset from the connection line.

7. The fuel cell module according to claim 1, wherein the fuel cell module includes a first area where the exhaust gas combustor and the start-up combustor are provided;

an annular second area around the first area where one of the reformer and the heat exchanger is provided;

an annular third area around the second area where another of the reformer and the heat exchanger is provided; and an annular fourth area around the third area where the evaporator is provided.

8. The fuel cell module according to claim 1, wherein the fuel cell module is a solid oxide fuel cell module.

* * * * *